US011435185B2

(12) United States Patent
Levine et al.

(10) Patent No.: US 11,435,185 B2
(45) Date of Patent: Sep. 6, 2022

(54) SYSTEMS AND METHODS FOR DEEP LEARNING-BASED PEDESTRIAN DEAD RECKONING FOR EXTEROCEPTIVE SENSOR-ENABLED DEVICES

(71) Applicant: Microsoft Technology Licensing, LLC, Redmond, WA (US)

(72) Inventors: Evan Gregory Levine, Seattle, WA (US); Raymond Kirk Price, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 372 days.

(21) Appl. No.: 16/797,798

(22) Filed: Feb. 21, 2020

(65) Prior Publication Data

US 2021/0262800 A1    Aug. 26, 2021

(51) Int. Cl.
| | | |
|---|---|---|
| *G01C 21/16* | (2006.01) | |
| *G06F 3/0346* | (2013.01) | |
| *G01S 5/02* | (2010.01) | |
| *G01S 5/14* | (2006.01) | |
| *G02B 27/01* | (2006.01) | |
| *G06N 7/00* | (2006.01) | |

(Continued)

(52) U.S. Cl.
CPC ............ *G01C 21/16* (2013.01); *G01S 5/0278* (2013.01); *G01S 5/0294* (2013.01); *G01S 5/145* (2013.01); *G02B 27/0172* (2013.01); *G06F 3/0346* (2013.01); *G06N 7/005* (2013.01); *G06T 19/006* (2013.01); *H04W 4/026* (2013.01); *H04W 4/027* (2013.01)

(58) Field of Classification Search
CPC ..... G01C 21/16; G01S 5/0278; G01S 5/0294; G01S 5/145; G02B 27/0172; G06F 3/0346; G06F 3/012; G06F 3/011; G06N 7/005; G06T 19/006; H04W 4/026; H04W 4/027
See application file for complete search history.

(56) References Cited

U.S. PATENT DOCUMENTS

| | | | |
|---|---|---|---|
| 2005/0008256 A1* | 1/2005 | Uchiyama | ................. G06T 7/80 382/291 |
| 2018/0091924 A1* | 3/2018 | Hammerschmidt | .... H04S 7/304 |

(Continued)

FOREIGN PATENT DOCUMENTS

WO    2019038757 A2    2/2019

OTHER PUBLICATIONS

"International Search Report and Written Opinion Issued in PCT Application No. PCT/US21/015979", dated May 17, 2021, 13 Pages. (MS# 408046-WO-PCT).

(Continued)

*Primary Examiner* — Jitesh Patel
(74) *Attorney, Agent, or Firm* — Workman Nydegger

(57) ABSTRACT

Systems are provided for estimating 6DOF positioning of a computing device while in a pedestrian dead reckoning mode. The systems obtain a set of inertial tracking data from the set of one or more inertial tracking components while the system is in a pedestrian dead reckoning mode. Then, the systems obtain an estimated 3DOF velocity of the system based inertial tracking data, using a predictive model trained on a set of observed exteroceptive sensor data and observed inertial tracking data. The systems also obtain estimated 6DOF positioning of the systems based on the estimated 3DOF velocity.

31 Claims, 13 Drawing Sheets

(51) Int. Cl.
*G06T 19/00* (2011.01)
*H04W 4/02* (2018.01)

(56) References Cited

U.S. PATENT DOCUMENTS

2020/0273256 A1* 8/2020 Daniels .................. G06V 20/20
2020/0309529 A1* 10/2020 Lambert ................ G05D 1/027
2021/0004075 A1* 1/2021 Protter .................... G06F 3/011

OTHER PUBLICATIONS

Zhang, et al., "A New Method of Seamless Land Navigation for GPS/INS Integrated System", In Journal of Measurement, vol. 45, Issue 4, Dec. 28, 2011, pp. 691-701.

Chen, et al., "IONet: Learning to cure the curse of drift in inertial odometry", In Proceedings of Thirty-Second AAAI Conference on Artificial Intelligence, Apr. 26, 2018, pp. 6468-6476.

Cortés, et al., "Deep Learning Based Speed Estimation for Constraining Strapdown Inertial Navigation on Smartphones", In Proceedings of IEEE 28th International Workshop on Machine Learning for Signal Processing, Sep. 17, 2018, 6 Pages.

Jimenez, et al., "A Comparison of Pedestrian Dead-Reckoning Algorithms using a Low-Cost MEMS IMU", In Proceedings of the 6th IEEE International Symposium on Intelligent Signal Processing, Aug. 26, 2009, pp. 37-42.

Li, et al., "A Reliable and Accurate Indoor Localization method using Phone Inertial Sensors", In Proceedings of the ACM Conference on Ubiquitous Computing, Sep. 5, 2012, pp. 421-430.

Noureldin, et al., "Fundamentals of inertial navigation, satellite-based positioning and their integration", In Publication of Springer Science & Business Media, Oct. 28, 2012.

Wonho, et al., "SmartPDR: Smartphone-based pedestrian dead reckoning for indoor localization", In Journal of IEEE Sensors Journal, vol. 15, Issue 5, May 2015, pp. 2906-2916.

Xiao, et al., "Robust pedestrian dead reckoning (R-PDR) for arbitrary mobile device placement", In Proceedings of International Conference on Indoor Positioning and Indoor Navigation, Oct. 27, 2014, pp. 187-196.

Yan, et al., "RIDI: Robust IMU Double Integration", In Proceedings of the European Conference on Computer Vision, Sep. 8, 2018, pp. 1-16.

Zhang, et al., "Pedestrian dead-reckoning indoor localization based on OS-ELM", In Journal of IEEE Access, vol. 6, Jan. 10, 2018, pp. 6116-6129.

* cited by examiner

SYSTEMS AND METHODS FOR DEEP LEARNING-BASED PEDESTRIAN DEAD RECKONING FOR EXTEROCEPTIVE SENSOR-ENABLED DEVICES

BACKGROUND

Mixed-reality systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Mixed-reality systems may use one or more on-body devices (e.g., the HMD, a handheld device, etc.). The HMD provides a display that enables a user to view overlapping and/or integrated visual information in whatever environment the user is in, be it a VR environment or an AR environment.

Conventional mixed-reality devices often rely on exteroceptive sensor data (e.g., visual tracking data, GPS data, and so forth) in order to track the trajectory of the mixed-reality devices (e.g., to track position over time and/or to accurately render virtual objects). However, many environments exist in which exteroceptive sensing capabilities are denied, unreliable, or otherwise unusable to provide accurate trajectory tracking. Consequently, many mixed-reality devices (and other mobile computing devices) rely on processing data obtained by only interoceptive sensors for estimating the trajectory of the devices. Dead reckoning is one type of a process that can be used for determining positioning of a device without using exteroceptive sensor data. Current dead reckoning modes, and other processes that rely on interoceptive sensor data to estimate trajectory and device positioning, suffer from a number of shortcomings, such as drift (e.g., a growing error between true position and predicted position), high computational cost, and failure to account for per-user and/or per-device characteristics.

Accordingly, there exists an ongoing need to provide improved systems and methods for tracking the trajectory of mobile computing devices when exteroceptive sensing capabilities are hindered, unreliable and/or undesired.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods for deep learning-based pedestrian dead reckoning for exteroceptive sensor-enabled devices.

In some embodiments, a computing device is configured for estimating six degree of freedom (6DOF) positioning of the computing device, while the computing device is in a pedestrian dead reckoning mode, based at least partially on a trained predictive model.

In some embodiments, the device obtains a set of inertial tracking data from a set of one or more inertial tracking components (e.g., accelerometer, gyroscope and/or compass) while the computing device is in the pedestrian dead reckoning mode and also obtains an estimated three degree of freedom (3DOF) velocity of the computing device as output from the predictive model. The 3DOF velocity is provided as output in response to a first subset of inertial tracking data obtained from the set of inertial tracking data as input into the predictive model.

In some instances, the predictive model is a predictive model that was trained on a set of training data including both observed exteroceptive sensor data (e.g., GPS or radio-positioning data, visual tracking data, and so forth) and observed inertial tracking data. The predicted 3DOF velocity and/or predictive model can also be used, in some instances, for obtaining an estimated 6DOF positioning of the computing device by fusing the estimated 3DOF velocity with a second subset of inertial tracking data that is based on the set of inertial tracking data.

In some embodiments, methods are provided for estimating 6DOF positioning of a computing device while the computing device is in a pedestrian dead reckoning mode. These methods include detecting a pedestrian dead reckoning mode triggering condition and obtaining a set of inertial tracking data from a set of one or more inertial tracking components of the computing device in response to detecting the pedestrian dead reckoning mode triggering condition. These methods also include, in some instances, obtaining an estimated three degree of freedom (3DOF) velocity of the computing device.

The disclosed methods also include, in some instances, obtaining an estimated 6DOF positioning of the computing device without obtaining exteroceptive sensor data with the exteroceptive sensor system of the computing device by fusing the estimated 3DOF velocity with an estimated 3DOF rotation of the computing device. The estimated 3DOF rotation of the computing device is based on the set of inertial tracking data.

In some instances, the method also includes detecting (with the computing device) an exteroceptive sensor mode triggering condition and, in response to detecting the exteroceptive sensor mode triggering condition, obtaining exteroceptive sensor data with an exteroceptive sensor system of the computing device.

In some embodiments, a head-mounted display (HMD) is configured for providing training data to an on-device neural network for training a predictive model for use in estimating 6DOF positioning, while the HMD is in a pedestrian dead reckoning mode. In such embodiments, the HMD includes a set of inertial tracking components (e.g., at least one of an accelerometer, a gyroscope, and/or a compass) configured to generate inertial tracking data, an exteroceptive sensor system configured to generate exteroceptive sensor data, one or more processors, and one or more computer-readable media having stored computer-executable instructions that are operable, when executed by the one or more processors, to cause the system to perform disclosed methods.

The disclosed methods include, in some instances, acts of obtaining a set of inertial tracking data from the set of one or more inertial tracking components while the computing device is not in the pedestrian dead reckoning mode, obtaining exteroceptive sensor data (e.g., visual positioning data or radio-based positioning data, GPS data or so forth) from the exteroceptive sensor system, and training a predictive model for use in estimating 6DOF positioning of the HMD when the HMD is in a pedestrian dead reckoning mode by providing training data to an on-device neural network. The training data includes (1) the set of inertial tracking data as input and (2) at least a portion of the inertial tracking data fused with the exteroceptive sensor data as ground truth output.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
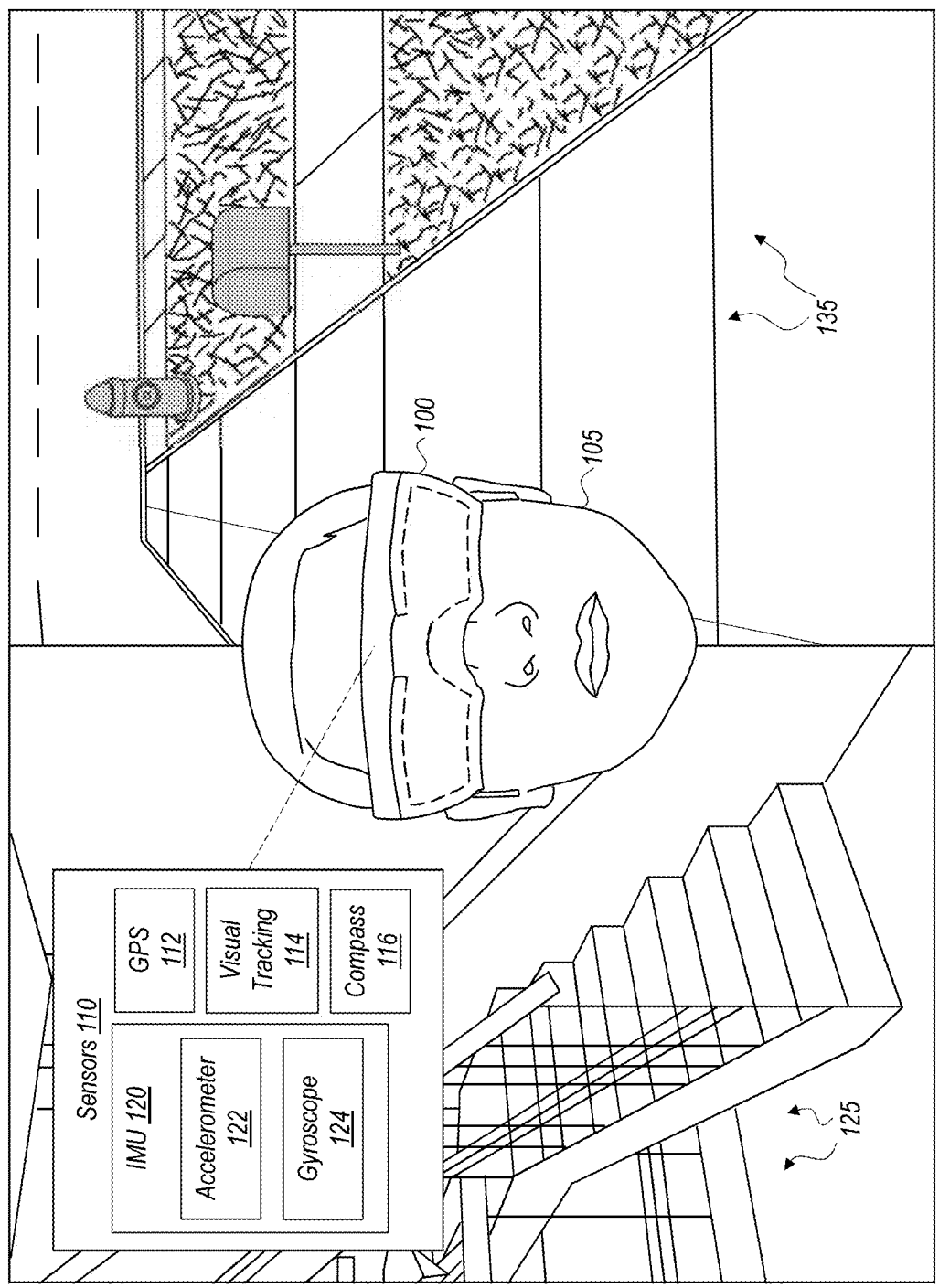
FIG. 1 illustrates an example of components of a computing device (e.g., a mixed-reality HMD) that includes sensors for use within various operational environments.

Disclosed embodiments are directed to systems and methods for training and utilizing predictive models for use in a pedestrian dead reckoning (PDR) mode in combination with inertial tracking data to estimate a trajectory of a computing device.

Conventional approaches for utilizing inertial tracking data to estimate trajectory of a mobile computing device suffer from several deficiencies. For example, inertial navigation systems (INSs) rely on data from inertial measurement units (IMUS) (e.g., accelerometer data and gyroscope data) to estimate position by integrating rotational velocity data and double-integrating acceleration data. The double integration of the acceleration results in a quadratically increasing growth of position errors. Accordingly, INS systems are typically not relied on in consumer systems for more than one second.

Some approaches for estimating device trajectory/positioning involve PDR. In particular, PDR can be used to track user trajectory when a user makes repetitive motions (e.g., when walking or running) and by applying estimates of those motions to the estimated positioning of the device. PDR approaches seek to address the drift rate associated with INS systems by processing the IMU signals in a different manner. Some conventional PDR approaches threshold acceleration data to identify steps taken. Some PDR approaches also explicitly estimate the user gait parameters (e.g., step/stride length, step width, foot angle) and fuse each step with heading or orientation data to produce a trajectory estimate. However, such approaches still suffer from inaccuracies, for example, because not all of a user's steps are uniform (e.g., when a user accelerates their walking/running speed, rounds a corner, changes elevation), making explicit estimations of user gait parameters incomplete and/or impractical. Additionally, such approaches fail to account for variations in gait parameters across users.

Accordingly, as noted above, at least some disclosed embodiments are directed to systems and methods for training and/or utilizing predictive models for use in a PDR mode in combination with inertial tracking data to estimate a trajectory of a computing device.

In at least some implementations of the present disclosure, computing devices are configured for estimating six degree of freedom (6DOF) positioning of the computing device while the computing device is in a pedestrian dead reckoning mode by at least obtaining an estimated three degree of freedom (3DOF) velocity of the computing device as output from a predictive model in response detected inertial tracking data.

In some embodiments, methods are also provided for selectively training/tuning the predictive model with inertial tracking data and exteroceptive sensor data (e.g., radio-based position data and/or visual tracking data) obtained by sensors of the computing device in response to detecting an exteroceptive sensor mode triggering condition (e.g., a radio-based positioning mode triggering condition and/or a visual tracking mode triggering condition).

As used herein, 3DOF velocity refers to translation velocity according to three perpendicular directional axes (e.g., x, y, and z; north, east, and upward/vertical), and 3DOF rotation refers to rotation according to rotational axes about three perpendicular directional axes (e.g., pitch, yaw, and roll). 6DOF refers to positioning/velocity information associated with three perpendicular directional axes and the three rotational axes about each of the three perpendicular directional axes. 3DOF and 6DOF are well-known to those of skill in the art.

Those skilled in the art will also recognize that at least some of the disclosed embodiments may be used to address various shortcomings of conventional systems and methods for estimating the trajectory of a computing device in the absence of reliable exteroceptive sensing capabilities (e.g., GPS, visual tracking system). For example, disclosed systems and methods may be used to provide deep learning-based PDR functionality that utilizes a predictive model trained on tracking data to provide trajectory estimations for a device operating in the PDR mode to depend on 3DOF velocity that is dynamically based on input inertial tracking data. This is an improvement over existing system that rely on rigid, inflexible predetermined explicit estimations of user gait parameters, such as in conventional PDR systems, to make such estimations.

The disclosed/estimated 3DOF velocity, which is obtained from the predictive model, can become fused with other kinematic information, such as 3DOF rotation estimations based on the inertial tracking data, to provide an estimated 6DOF positioning of the computing device. Decoupling rotation estimation from velocity estimation, which is obtained by the predictive model, allows the predictive model to be trained on and track fewer variables (e.g., smaller time history, no tracking of reference/initial orientations). This can result in generating more focused output (e.g., 3DOF velocity output within a smaller domain than 6DOF positioning output) and which can also be used to obtain a more accurate resulting 6DOF pose estimation by fusing the predictive model output (3DOF velocity) with an asynchronously calculated 3DOF rotation estimate, for example.

The predictive model can also be advantageously fine-tuned to a particular user, computing device, user activity (or other) context, etc. based on new training data. For instance, a computing device can determine that exteroceptive sensors are sufficiently reliable to trigger a tuning mode (e.g., a GPS mode and/or a visual tracking mode), whereby inertial tracking data and exteroceptive sensor data (e.g., GPS data and/or visual tracking data) are provided as training data to a machine learning engine (e.g., an on-device machine learning engine and/or a remote machine learning engine) to further train the predictive model to more accurately predict 6DOF positioning based on inertial tracking data associated with the particular user, computing device, and/or user activity (or other) context.

In addition, at least some of the disclosed systems/devices can be used to determine when to activate a PDR mode or a tuning mode (e.g., a GPS mode and/or visual tracking mode) based on detected triggering conditions (e.g., the presence/availability/accuracy of GPS data and/or visual tracking data). Accordingly, at least some of the presently disclosed systems/devices can automatically fine-tune the predictive model for use in pedestrian dead reckoning when appropriate training data is available and/or automatically activate a pedestrian dead reckoning mode upon determining that exteroceptive sensors (e.g., GPS, visual tracking systems) are not sufficiently accurate/available for estimating trajectory (e.g., upon determining whether an exteroceptive sensor triggering condition is present or not).

Having just described some of the various high-level features and benefits of the disclosed embodiments, attention will now be directed to FIGS. 1 through 12. These Figures illustrate various conceptual representations, architectures, methods, and supporting illustrations related to one or more implementations of the present disclosure. The disclosure will then turn to FIG. 13, which presents an example computer system that may be used to facilitate the disclosed principles.

FIG. 1 illustrates an example of components of a computing device (e.g., a mixed-reality head-mounted display (HMD) 100) that includes sensors 110 for use within various operational environments (e.g., indoor environment 125, outdoor environment 135). FIG. 1 shows the HMD 100 being worn by a user 105. Although the present description and/or Figures focuses, in some ways, on HMDs (e.g., HMD 100), those skilled in the art will appreciate, in view of the present disclosure, that the principles disclosed herein are applicable to other mobile computing devices, such as, but not limited to, tablets, laptops, mobile phones, watches, and/or other wearable or otherwise mobile computing systems (see, e.g., FIG. 13 and the attendant description).

As noted, FIG. 1 shows that an HMD 100 (or other mobile computing device) can include any combination of sensors 110. The sensors 110 can include inertial tracking components, such as one or more accelerometers 122, gyroscopes 124, and/or compasses 116. The sensors 110 can also include any number of exteroceptive sensors, such as one or more global positioning systems (GPSs) 112, and/or visual tracking systems 114.

FIG. 1 also demonstrates that, in some implementations, the accelerometer(s) 122 and the gyroscope(s) 124 are associated with an inertial measurement unit (IMU) 120. One will appreciate that the compass(es) 116 can, in some embodiments, be associated with the IMU 120 or another IMU.

The inertial tracking components (e.g., the accelerometer(s) 122, the gyroscope(s) 124, and/or the compass(es) 116) are configured to generate inertial tracking data. Because the inertial tracking components are interoceptive sensors, they do not depend on the condition/configuration of the environment surrounding the HMD 100. Thus, the inertial tracking components can provide inertial tracking data in most real-world environments.

A computing device (e.g., HMD 100) can combine the inertial tracking data obtained by the inertial tracking components with other sensor data to predict the trajectory (e.g., 6DOF pose) of the computing device. For example, the HMD 100 can employ other components not shown in FIG. 1 (e.g., processor(s) 1305, code 1350 of storage 1345, see FIG. 13) to combine radio-based positioning data obtained by the GPS 112 with inertial tracking data to estimate the trajectory of the HMD 100. Put differently, the GPS 112 and the inertial tracking components of the HMD can operate as a GPS/inertial navigation system. In some instances, a GPS/INS system can operate with a precision within a range of 2 to 3 meters.

Although FIG. 1 specifies GPS 112 as a component of HMD 100, those skilled in the art will recognize, in view of the present disclosure, that other forms/types of radio-based positioning systems are within the scope of this disclosure. By way of non-limiting example, an HMD 100 can include any form/combination of bearing measurement systems, beam systems, transponder systems, hyperbolic systems, and/or other global navigation satellite systems (e.g., Galileo, QZSS, Beidou, etc.).

Additionally, or alternatively, the visual tracking system(s) 114 can operate in concert with the inertial tracking components to operate as a visual-inertial navigation system. Visual-inertial navigation uses inertial motion modeling data (e.g., from IMU 120 and compass 116) with visual tracking data (e.g., obtained by visual tracking system(s) 114) that provides a mapping that corrects for the drift of the IMU. Incremental poses obtained by visual-inertial navigation methods can be used to estimate the position of the HMD 100 (and user 105) as it moves through space.

For example, visual-inertial Simultaneous Location and Mapping (SLAM) in an HMD 100 fuses (e.g., with a pose filter) visual tracking data obtained by one or more components of the visual tracking system(s) 114 with data obtained by the accelerometer(s) 122, gyroscope(s) 124, and compass(es) 116 to estimate 6DOF pose in space and in real time. The visual tracking data can include head tracking data obtained with one or more head tracking cameras of the visual tracking systems 114 and, optionally, depth mapping data obtained by one or more depth detection systems of the visual tracking systems 114 (e.g., to provide frames of reference when there are none). In some instances, a visual-inertial navigation system can operate with a precision within a magnitude of centimeters or millimeters and with pointing accuracy within a magnitude of milliradians.

Unlike the inertial tracking components described above (e.g., the IMU 120 and the compass(es) 116), the usability and/or accuracy of the exteroceptive sensors (e.g., the GPS(s) 112 and/or the visual tracking system(s) 114) are subject to environmental conditions. For instance, GPSs are line of sight systems, relying on a line of sight between the mobile computing device housing the GPS 112 and a plurality of satellites to accurately obtain radio-based positioning data. Thus, although a GPS 112 might function adequately in an outdoor environment 135, a GPS 112 might fail to provide radio-based positioning data in an indoor environment 125, high multipath environments, subterranean environments, heavily wooded environments, and/or environments in which physical objects (e.g., buildings) block the line of sight between the GPS 112 and multiple satellites.

Furthermore, visual-inertial navigation often relies on the visual tracking system(s) 114 capturing visual tracking data based on camera images (e.g., with two or more head tracking cameras) that include identifiable features (e.g., anchor points) within a static environment in order to provide accurate trajectory estimations. Therefore, although a visual tracking system 114 might function adequately in a well-lit, static indoor environment 125, a visual tracking system might fail to provide visual tracking data in outdoor environments 135 and/or environments that are dark, include smoke and/or fog, lack texture/identifiable features (e.g., desert scenes), and/or are highly dynamic (e.g., rolling waves, moving trees, etc.).

Accordingly, as will be discussed in more detail herein, at least some computing devices (e.g., HMD 100) according to the present disclosure can operate in a PDR mode that involves providing inertial tracking data to a predictive model to obtain an estimated 3DOF velocity of the computing device and fusing the 3DOF velocity with inertial tracking information to obtain an estimated 6DOF positioning of the computing device. The predictive model used to obtain 3DOF velocity can be generated with a machine learning engine (e.g., machine learning engine 240, 1310) and can be trained on training data from various sources in various forms.

Figure 2:
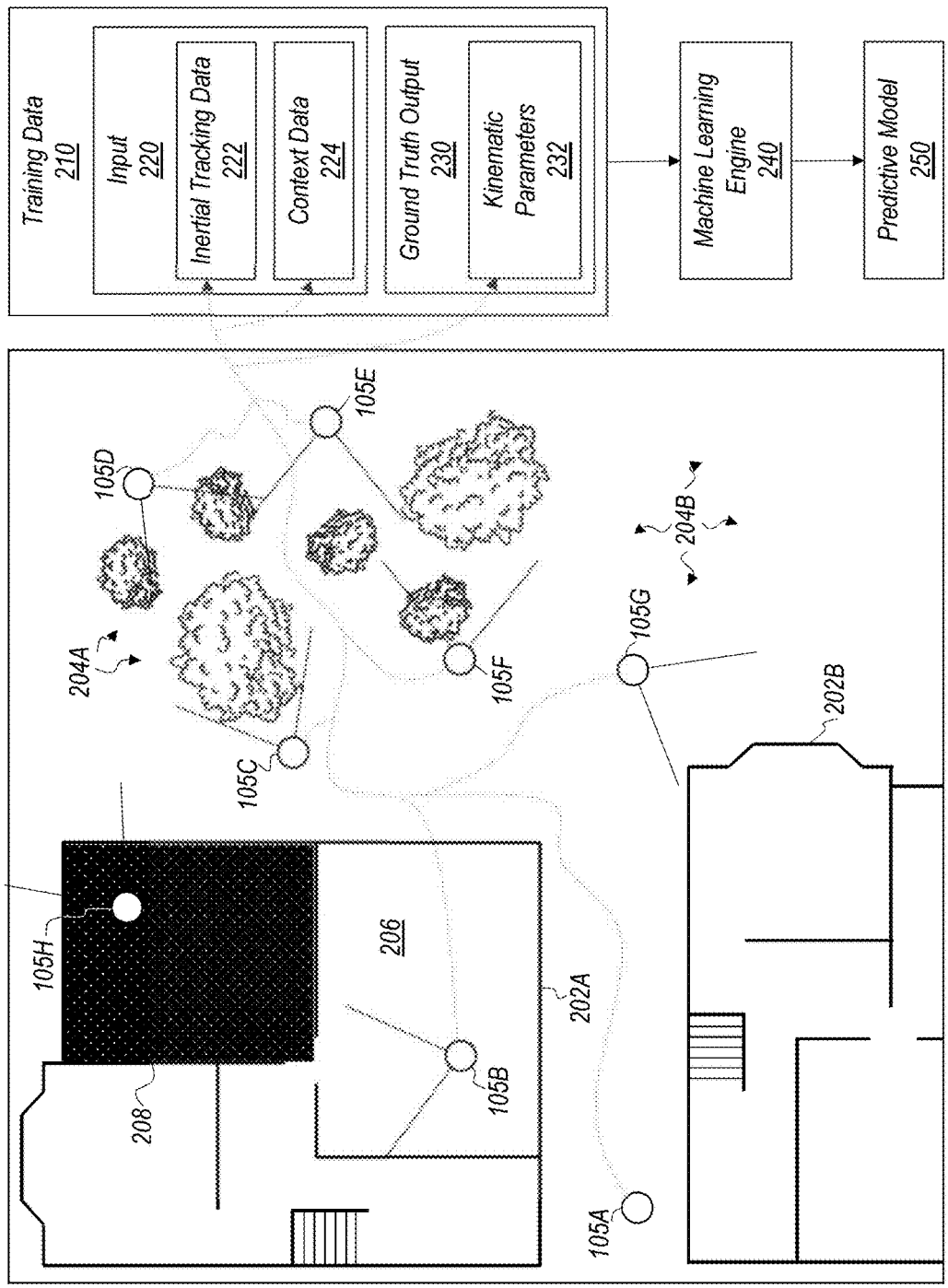
FIG. 2 provides a conceptual representation of various users operating various computing devices in various environments and obtaining/providing training data for building a predictive model for use in a pedestrian dead reckoning mode.

For instance, FIG. 2 provides a conceptual representation of various users operating various computing devices (e.g., similar to or different than HMD 100) in various environments and obtaining/providing training data 210 for building, with a machine learning engine 240, a predictive model 250 for use in a PDR mode.

The predictive model 250 can refer to any type of predictive model generated by a machine learning engine 240, program, system, module, etc. For example, a predictive model 250 can take the form of a neural network. Additional details concerning neural networks will be described hereafter.

The training data 210 can be pooled from a variety of different users. For instance, FIG. 2 shows dashed arrows extending between different users 105A, 105B, 105C, 105D, 105E, 105F, and 105G and various portions of the training data 210. Each user represented in FIG. 2 is operating a computing device (e.g., similar to or different than HMD 100), and the lines extending from the depictions of the various users represented in FIG. 2 indicate a line of sight of the visual tracking system(s) 114 of each user's computing device, if present. Furthermore, at least some of the users represented in FIG. 2 are operating their respective computing devices in different environments, indicating that different users can provide different training data 210 for building the predictive model 250. The various user computing devices can provide training data 210 to a common repository, such as a remote computing system, server, and/or cloud network (e.g., Microsoft Azure) that is in communication with each user computing device for building the predictive model.

FIG. 2 illustrates that the training data 210 includes input data 220 that can include inertial tracking data 222 and context data 224. The inertial tracking data 222 can include observed acceleration data, angular velocity data, and/or heading data obtained by inertial tracking components (e.g., accelerometer(s) 122, gyroscope(s) 124, and/or compass(es) 116, respectively) of the various computing devices of the users 105A, 105B, 105C, 105D, 105E, 105F, and/or 105G.

As noted hereinabove, because the inertial tracking components of a computing device of the present disclosure are interoceptive sensors, the inertial tracking components can provide inertial tracking data regardless of environmental conditions. Accordingly, the computing devices of the various users 105A, 105B, 105C, 105D, 105E, 105F, and 105G can provide observed inertial tracking data 222 for use as input data 220 of training data 210 for training the predictive model 250, even when at least some of the various users 105A, 105B, 105C, 105D, 105E, 105F, and 105G are operating their computing devices under different environmental conditions.

Similarly, because the inertial tracking components are interoceptive, a computing device (e.g., HMD 100) can obtain inertial tracking data even in environments in which radio-based navigation and/or visual tracking are inoperable/unusable. Thus, the inertial tracking data can serve as an input for estimating 6DOF positioning when the computing device is operating in a PDR mode, as will be described in more detail hereinafter with reference to FIG. 3.

FIG. 2 also shows that the training data 210 can include ground truth output 230 that includes kinematic parameters 232. As indicated hereinabove, the inertial tracking data 222 obtained by a computing device can be combined with exteroceptive sensor data (e.g., GPS/INS, visual-inertial navigation system) to provide accurate estimation/tracking of kinematic parameters 232 such as position, velocity, rotation, heading, and/or other kinematic parameters 232.

As indicated hereinabove, and as illustrated and described with reference to FIG. 3, the embodiments and implementations described herein focus, in some respects, on 3DOF velocity as a kinematic parameter 232 that the predictive model 250 estimates when the computing device is operating in a PDR mode. Notwithstanding, those skilled in the art will recognize, in view of the present disclosure, that a computing device can employ a predictive model 250 to estimate any kinematic parameter 232 that was provided ground truth output 230 for building the predictive model 250.

The systemic approach by which a user's computing device provides kinematic parameters 232 as ground truth output 230 can vary depending on the environment in which the user is operating their computing device (e.g., depending on which exteroceptive sensing capabilities are available to the user's computing device).

For example, FIG. 2 shows user 105A positioned in an outdoor environment between building 202A and 202B. The computing device employed by user 105A lacks a visual tracking system 114 (e.g., indicated by the lack of vision lines extending from the depiction of user 105A in FIG. 2). Notwithstanding, provided that the computing device of user 105A includes a GPS 112 that can acquire sufficiently accurate radio-based positioning data, the computing device of user 105A can generate kinematic parameters 232 based on GPS/INS. The computing device of user 105A can thereby provide kinematic parameters 232 as ground truth output 230 of training data 210 for training predictive model 250 with a machine learning engine 240.

One will appreciate, in view of the foregoing, that the computing devices of various users for providing training data 210 can include different hardware attributes, elements, and/or functionalities. For instance, various user computing devices for providing training data 210, according to the present disclosure, can include, in addition to inertial tracking components, a GPS 112 while omitting a visual tracking system 114 (e.g., a smartphone that includes a GPS 112 but omits a visual tracking system 114), a visual tracking system 114 while omitting a GPS 112, or a GPS 112 in addition to a visual tracking system 114.

In another example, FIG. 2 shows user 105B positioned in an indoor environment 206 within building 202A. Thus, the computing device of user 105B may experience degraded GPS/INS capabilities (e.g., the line of sight between the computing device and one or more satellites can be occluded by building 202A). However, provided that the indoor environment 206 is a well-lit environment with sufficient environmental texture/features, the computing device of user 105B can obtain visual tracking data (e.g., with visual tracking system(s) 114 of the computing device) for generating kinematic parameters 232 based on visual-inertial navigation. The computing device of user 105B can thereby provide kinematic parameters 232 as ground truth output 230 of training data 210 for training predictive model 250 with a machine learning engine 240.

In yet another example, FIG. 2 shows users 105C, 105D, 105E, and 105F are positioned in an outdoor wooded environment 204A. Thus, the computing devices of users 105C, 105D, 105E, and 105F may experience adequate GPS/INS capabilities (e.g., depending on the density of the outdoor wooded environment 204A). Thus, even if the trees of the wooded environment 204A are not static (e.g., moving in response to wind), resulting in the visual tracking system(s) 114 of the computing devices of users 105C, 105D, 105E, and 105F experiencing degraded visual tracking functionality, the computing devices of users 105C, 105D, 105E, and 105F can obtain radio-based positioning data (e.g., with GPS 112 of the computing devices) for generating kinematic parameters 232 based on GPS/INS. The computing devices of users 105C, 105D, 105E, and 105F can thereby provide kinematic parameters 232 as ground truth output 230 of training data 210 for training predictive model 250 with a machine learning engine 240.

In still another example, FIG. 2 shows user 105G positioned in an outdoor environment 204B, with the visual tracking system(s) 114 of the user 105G directed toward the textured exterior of building 202B. Thus, the computing device of user 105G may experience adequate GPS/INS capabilities and adequate visual-inertial navigation capabilities simultaneously. Thus, the computing device of user 105G can obtain visual tracking data (e.g., with visual tracking system(s) 114 of the computing device) and radio-based positioning data (e.g., with GPS 112 of the computing device) for generating kinematic parameters 232 based on visual-inertial navigation and GPS/INS in combination. The computing device of user 105G can thereby provide kinematic parameters 232 as ground truth output 230 of training data 210 for training predictive model 250 with a machine learning engine 240.

FIG. 2 also illustrates that the various computing devices of the various users (e.g., 105A, 105B, 105C, 105D, 105E, 105F, 105G) can provide context data 224. The context data 224 can include any information that is contextually relevant to the inertial tracking data 222, the kinematic parameters 232, the specific user using the computing device, the activity in which the user is engaged in, and/or the hardware attributes of the particular specific computing device. By way of non-limiting example, the context data 224 can include physical attributes of a specific user that is using a computing device, such as age, height, weight, physical conditions (e.g., knee, ankle, and/or other injuries), etc. The attributes can be provided by the user as user input and associated with a user profile of the user (e.g., a user profile associated with a cloud network, such as Microsoft Azure).

In some instances, the context data 224 can include hardware attributes of the computing device that sends the training data 210. For example, FIG. 2 demonstrates that user 105A can utilize a computing device that lacks a visual tracking system 114, such as a mobile electronic (e.g., a smartphone) with a simple GPS 112 and other hardware, whereas one or more other users can utilize higher-end computing devices that include a visual tracking system 114 and/or a more robust GPS 112. Thus, one will appreciate that different sensors (e.g., IMU 120, compass 116, GPS 112, and/or visual tracking system 114) of various computing devices can have different hardware specifications and/or can experience different degrees of noise and/or can have different biases. The context data 224 can include information related to the sensors (e.g., model, accuracy and/or noise ratings, etc.).

Furthermore, the context data 224 can include information related to a specific activity in which a user is engaged. For instance, the different users illustrated in FIG. 2 can be engaging in different activities. By way of non-limiting example, user 105A can be engaged in running, user 105B can be engaged in a personal fitness activity, user 105G can be engaged in walking, and users 105C, 105D, 105E, and 105F can be engaged in a first responder training activity. In some instances, the context data 224 can include an indication of the activity in which the user providing the training data is/was engaged. A user can provide the particular activity as user input, and/or the activity can be determined based on an analysis of the inertial tracking data 222 and kinematic parameters 232 for a particular computing device/user.

In view of the foregoing, one will appreciate that various computing devices used by various users in various environments can provide training data 210 for training the predictive model 250. The training data 210 can be based on and/or include any combination of observed inertial tracking data, visual tracking data, and/or radio-based positioning data, as well as relevant context data.

FIG. 2 additionally illustrates a user 105H positioned within a dark or low-light room 208 of building 202A. As noted above, GPS 112 can fail within indoor environments, and visual tracking systems 114 can fail in low-light environments. Consequently, the computing device operated by user 105H will be unable to generate certain kinematic parameters associated with the user 105H (e.g., position, velocity). Thus, in some instances, the computing device operated by user 105H will be unable to provide ground truth output 230 as training data 210, in particular because the computing device operated by user 105H will be unaware of its trajectory within the dark or low-light room 208.

As indicated above, a computing device can employ a PDR mode of the present disclosure to estimate trajectory in environments in which exteroceptive sensors typically relied on to determine trajectory are unavailable (e.g., GPS 112 and/or visual tracking system(s) 114).

Figure 3:
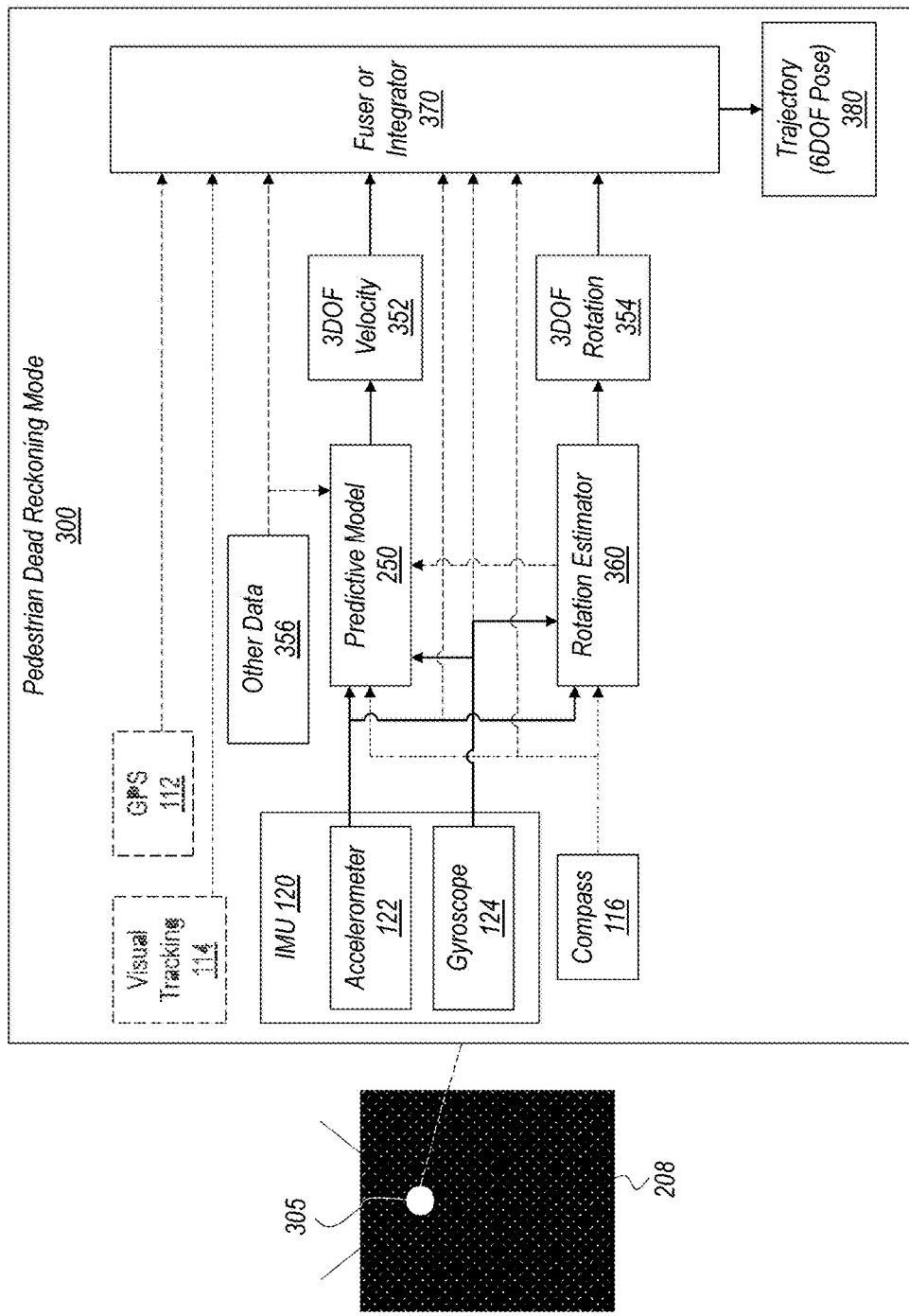
FIG. 3 illustrates an example architecture for a pedestrian dead reckoning mode for estimating a trajectory of a computing device, as well as a conceptual representation of an environment in which a pedestrian dead reckoning mode can be enabled.

FIG. 3 illustrates an example architecture for a pedestrian dead reckoning mode 300 for estimating a trajectory 380 of a computing device worn by a user 305, as well as a conceptual representation of a dark or low-light room 208 in which a PDR mode 300 can be enabled. Those skilled in the art will appreciate, in view of the present disclosure, that the dark or low-light room 208 is an illustrative environment only and is not limiting in any way. For example, other environments in which a PDR mode 300 can be enabled to estimate trajectory 380 include foggy or smoke-filled environments, subterranean environments, highly dynamic environments, textureless/featureless environments, environments in which GPS signals are interrupted or unavailable, etc.

Furthermore, a PDR mode 300 can be implemented by various computing devices. FIG. 3 illustrates the visual tracking system 114 and the GPS 112 with dashed lines and with partially faded text, indicating that some computing devices can include both a GPS 112 and a visual tracking system 114, only one of either a GPS 112 or a visual tracking system 114, or neither a GPS 112 nor a visual tracking system. For instance, the exteroceptive sensor system (e.g., GPS 112 and/or visual tracking system 114) of the computing devices of the present disclosure can be selectable detachable from the computing devices.

In one example, a computing device includes a visual tracking system 114 while omitting a GPS 112. In such instances, the computing device can enable a PDR mode 300 upon determining that a triggering condition for enabling the PDR mode 300 exists, such as determining that the visual tracking system 114 is not sufficiently reliable for estimating trajectory (e.g., in combination with an inertial tracking data under visual-inertial navigation). For example, the computing device can analyze the visual tracking data obtained by the visual tracking system 114 and determine that the visual tracking data has a signal quality or confidence level that is below a threshold value (e.g., for a head tracking system, the number of identifiable anchor points is below a threshold value). In response to determining that the signal quality or confidence level is below the threshold value, the computing device can enable the PDR mode 300.

In another example, a computing device includes a GPS 112 while omitting a visual tracking system 114. In such instances, the computing device can enable a PDR mode 300 upon determining that a triggering condition for enabling the PDR mode 300 exists, such as determining that the GPS 112 is not sufficiently reliable for estimating trajectory (e.g., in combination with inertial tracking data under GPS/INS). For example, the computing device can analyze the radio-based positioning data obtained by the GPS 112 and determine that the radio-based positioning data has a signal quality or confidence level that is below a threshold value (e.g., a threshold number of satellites in view is not met). In response to determining that the signal quality or confidence level is below the threshold value, the computing device can enable the PDR mode 300.

In yet another example, a computing device includes both a GPS 112 and a visual tracking system 114. In such instances, the computing device can enable a PDR mode 300 upon determining that a triggering condition for enabling the PDR mode 300 exists, such as determining that both the GPS 112 and the visual tracking system 114 are not sufficiently reliable for estimating trajectory (e.g., in combination with inertial tracking data under visual-inertial navigation or GPS/INS).

In still another example, a computing device includes neither a GPS 112 nor a visual tracking system 114. Provided that an initial position, the computing device can enable a PDR mode 300 to estimate trajectory even in the absence of any exteroceptive sensors.

One will appreciate that other triggering conditions for enabling a PDR mode 300 are within the scope of this disclosure. For example, a computing device could receive user input to enable the PDR mode 300 (e.g., to save battery power by relying on PDR to estimate trajectory rather than GPS/INS or visual-inertial navigation) and/or automatically activate the PDR mode 300 in response to detected battery conditions and/or user preferences (e.g., as indicated in a user profile associated with a user that is using the computing device). In this regard, even in environments in which exteroceptive sensing capabilities would not be hindered, a PDR mode 300 can be desirable and implemented on computing devices.

As noted above, FIG. 3 displays an example architecture for a PDR mode 300. FIG. 3 depicts various embodiments with various solid and dashed arrows. FIG. 3 focuses, in some respects, on one PDR mode embodiment that is governed by the solid arrow connections shown in FIG. 3. However, the solid arrow configuration described is illustrative only and non-limiting. For example, an embodiment can include any additional connections shown by the dashed arrows in FIG. 3. Additional example PDR mode embodiments depicted in FIG. 3 will be described hereafter.

FIG. 3 illustrates that a computing device employing the PDR mode 300 includes inertial tracking components (e.g., an IMU 120 including an accelerometer 122 and gyroscope 124, a compass 116). When operating in the PDR mode 300, the inertial tracking components obtain a set of inertial tracking data. The computing device then provides a first subset of the inertial tracking data to a predictive model 250. In accordance with one embodiment illustrated in FIG. 3, the first subset of inertial tracking data provided to the predictive model 250 includes acceleration data obtained by the accelerometer 122 and angular velocity data obtained by the gyroscope 124, as indicated by the solid arrows extending between the accelerometer 122 and the predictive model 250 and between the gyroscope 124 and the predictive model 250.

The predictive model corresponds to the predictive model 250 that was pre-trained according to the training data 210 from various, numerous users and computing devices described hereinabove with reference to FIG. 2. As mentioned earlier, the predictive model 250 can be trained/configured to estimate various kinematic parameters of the computing device, including 3DOF velocity 352, based on input (e.g., the first subset of inertial tracking data).

As noted hereinabove, the predictive model 250 can be implemented as a neural network. Example neural network architectures can include temporal convolutional networks (TCNs) or recurrent neural networks (RNNs) with recursive structures that enable causal estimation.

A predictive model 250 implemented as a TCN can operate on a window of data, which may include the last several seconds of inertial tracking measurements before or after the time of 3DOF velocity estimation. The hypothesis behind this module is that steps generate a repetitive measured signal, from which speed can be inferred (e.g., the repetitive structure is highly visible in accelerometer data). Example TCN architectures can include seven or eight layers with filters of size 3 (e.g., covering a receptive field of 1 to 10 seconds of 240 Hz IMU measurements). Other numbers of layers and/or filter sizes are within the scope of this disclosure.

A predictive model 250 implemented as an RNN can include gated recurrent units (GRUB), long-term-short-term memory cells (LTSMs), and/or vanilla RNNs. For instance, an RNN can include 2 to 3 layers with 128 hidden units, but other configurations are possible. Other neural networks and/or machine learning models are within the scope of this disclosure.

The 3DOF velocity 352 (or other kinematic parameters) obtained via the predictive model 250 can be combined with other information to generate an estimated trajectory 380 (6DOF pose). For example, a computing device can combine a second subset of inertial tracking data that is based on the set of inertial tracking data obtained by the inertial tracking components with the 3DOF velocity to estimate trajectory 380.

The second subset of inertial tracking data can include an estimated 3DOF rotation 354. The computing device can obtain the estimated 3DOF rotation 354 by providing a portion of the inertial tracking data to a rotation estimator 360. FIG. 3 shows that the inertial tracking data provided to the rotation estimator 360 can include data from the accelerometer 122 and the gyroscope 124, as indicated by solid arrows extending between the accelerometer 122 and the rotation estimator 360 and between the gyroscope 124 and the rotation estimator 360. FIG. 3 also shows that heading data obtained by the compass 116 can be provided to the rotation estimator 360 to estimate 3DOF rotation 354, as indicated by the dashed line extending between the compass 116 and the rotation estimator 360.

The rotation estimator 360 can take on various forms. For instance, the rotation estimator 360 can be implemented as an attitude and heading reference system (AHRS) and/or utilize an extended Kalman filter to obtain an estimated 3DOF rotation 354. The 3DOF rotation 354 can be a relative rotation (e.g., relative to an initial orientation, relative to a reference orientation (e.g., northward orientation)).

Once a computing device has obtained a 3DOF velocity 352 and a 3DOF rotation 354, the computing device can combine the 3DOF velocity 352 with the 3DOF rotation 354 to generate an estimated trajectory 380. The 3DOF velocity 352 and the 3DOF rotation 354 can be obtained via a fuser or integrator 370, which can take on various forms such as a Kalman filter (e.g., an extended Kalman filter) or a simple integrator that integrates the 3DOF velocity 352 subject to the 3DOF rotation 354.

In some implementations, decoupling the calculation of 3DOF rotation 354 from the calculation of 3DOF velocity 352 (which is obtained by the predictive model 250) allows the predictive model 250 to be trained on and track fewer variables (e.g., smaller time history, no tracking of reference/initial orientations) to generate more focused output (e.g., 3DOF velocity output within a smaller domain than 6DOF positioning output), providing a more accurate 6DOF pose estimation when fused with an asynchronously calculated 3DOF rotation estimate.

Accordingly, a computing device may employ a PDR mode 300 to estimate trajectory 380 (6DOF pose) without obtaining radio-based positioning data (e.g., via a GPS 112 of the computing device) and/or visual tracking data (e.g., via a visual tracking system 114).

In some implementations, the computing device is configured to utilize the estimated trajectory 380 (6DOF pose) for a variety of practical applications. For example, in some instances, the computing device is a HMD (e.g., HMD 100) that renders a mixed-reality scene (e.g., an AR scene or a VR scene) for display to a user and that may be based, at least in part, on positioning of the HMD relative to the real-world or within a virtual environment. In such embodiments, the updated and projected estimates of the trajectory 380 of the user are used to select and/or render HMD holograms and other display elements in a mixed-reality scene based on a determined HMD position that is based on the updated estimates of the trajectory 380 (e.g., such that rendered holograms/virtual objects appear appropriately world-locked with respect to the user).

In other instances, for example, the computing device records the estimated trajectory 380 to provide information about an activity of a user that is using the computing device (e.g., physical exercise metrics such as distance traveled, locomotion speed, etc.) to update a user's positioning/trajectory that is used by an application to provide application information, e.g., position on a map, fitness information based on movement, and so forth. In these and other embodiments, the positioning/trajectory information may be used to display output to a user that reflects user positioning and/or relative movement of the user based on the tracked/estimated trajectories that are determined according to the disclosed embodiments.

In yet other instances, the computing device utilizes estimated trajectory 380 (6DOF pose) to provide or supplement user navigation functionality (e.g., to enable continuous tracking of user positioning despite loss of a GPS signal on a smartphone).

In another example, the computing device provides the estimated trajectory 380 (6DOF pose) for one user to one or more other computing devices (e.g., for data collection about user movement within a consumer space; to enable collaboration among different users engaging in a task, such as team members engaging in a competitive activity, first responders, etc.).

As indicated hereinabove, the first subset of inertial tracking data provided to the predictive model 250 can include various subsets/combinations of inertial tracking data obtained by the inertial tracking components. For instance, in some implementations, the first subset of inertial tracking data includes only acceleration data obtained by the accelerometer 122. In other instances, the first subset of inertial tracking data includes data obtained by the accelerometer 122, gyroscope 124, and the compass 116 (as indicated by the dashed arrow extending between the compass 116 and the predictive model 250 in FIG. 3).

In yet other implementations, the rotation estimator 360 can provide the estimated 3DOF rotation 354 as an input to the predictive model 250 for estimating 3DOF velocity 352 (as indicated by the dashed arrow extending between the rotation estimator 360 and the predictive model 250). In this manner, the 3DOF rotation 354 can be used as an input into the predictive model 250 in addition to being fused with other data (including the 3DOF velocity 352 provided by the predictive model 250) to predict a trajectory 380 (6DOF positioning) of a computing device.

FIG. 3 also illustrates a dashed arrow extending between other data 356 and the predictive model 250. Other data 356 can include context data such as hardware attributes of the computing device, attributes of the user 305 that is using the computing device, and/or user activity information (e.g., as described hereinabove referring to context data 224 provided as input for pre-training the predictive model 250).

Furthermore, as indicated hereinabove, the second subset of inertial tracking data that becomes combined, fused, and/or integrated with the 3DOF velocity 352 to estimate trajectory 380 can include various data/information that is based on the set of inertial tracking data obtained by the inertial tracking components. For instance, the second subset of inertial tracking data can include any combination of acceleration data obtained by the accelerometer 122, angular velocity data obtained by the gyroscope 124, and heading data obtained by the compass 116 in addition or as an alternative to the 3DOF rotation 354 obtained by the rotation estimator 360 (as indicated in FIG. 3 by the dashed lines extending between the fuser or integrator 370 and the accelerometer 122, gyroscope 124, and the compass 116). In this regard, those skilled in the art will appreciate that at least some PDR mode 300 embodiments need not implement fusion/integration including a 3DOF rotation 354 to predict a trajectory 380 (6DOF positioning) of a computing device.

Additionally, FIG. 3 illustrates dashed lines extending between the visual tracking system 114 and the fuser or integrator 370, between the GPS 112 and the fuser or integrator 370, and between other data 356 and the fuser or integrator 370. In some implementations, the computing device obtains weak, partial, and/or otherwise incomplete visual tracking data with the visual tracking system 114 and/or radio-based positioning data with the GPS 112 that can aid in the estimation of trajectory 380 when fused and/or integrated with the 3DOF velocity and/or other information referenced herein. Furthermore, other data 356 can include a reference data to aid in the estimation of trajectory 380, such as user-provided positional data (e.g., a user-input longitude, latitude, and/or altitude) and/or third-party data (e.g., a global mesh/depth map obtained from a remote source).

As described, the predictive model 250 is pre-trained with training data 210 obtained from a variety of different users and/or computing devices. Different users, however, have different physical attributes (e.g., gait parameters) and often locomote differently than one another. Furthermore, as described above, different computing devices can have differing hardware attributes for their sensors (e.g., inertial and exteroceptive sensors). Thus, in some instances, although the predictive model 250 can operate to provide an improved trajectory estimation (as compared with conventional systems for estimating trajectory in the absence of exteroceptive sensor data), the predictive model 250 can be further improved by individualizing the predictive model to a particular user and/or a particular computing device employed by the particular user.

Accordingly, one aspect of the present disclosure is to provide systems and methods that enable the predictive model used in the PDR mode 300 to become tuned/tailored to particular users, computing devices, and/or activities after pre-training. Additionally, in some instances, the predictive model can be used to obtain the 6DOF directly, without first estimating the 3DOF, by using the predictive model and inertial data obtained from the device when the predictive model is trained with similar/related data from the same HMD device or other similar HMD devices.

Figure 4:
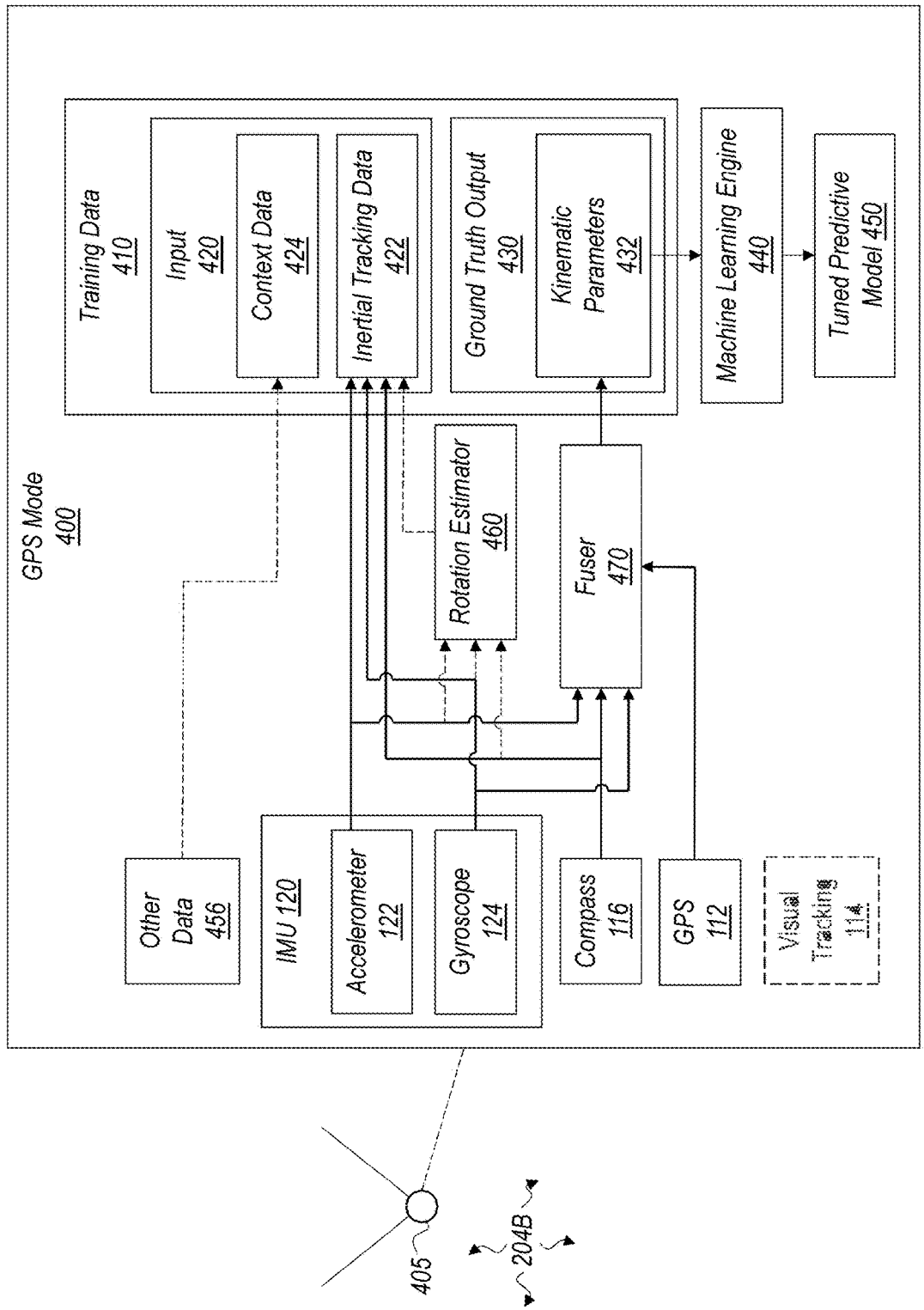
FIG. 4 illustrates an example architecture for a GPS mode for tuning a predictive model for use in the pedestrian dead reckoning mode, as well as a conceptual representation of an environment in which a GPS mode can be enabled.
Figure 5:
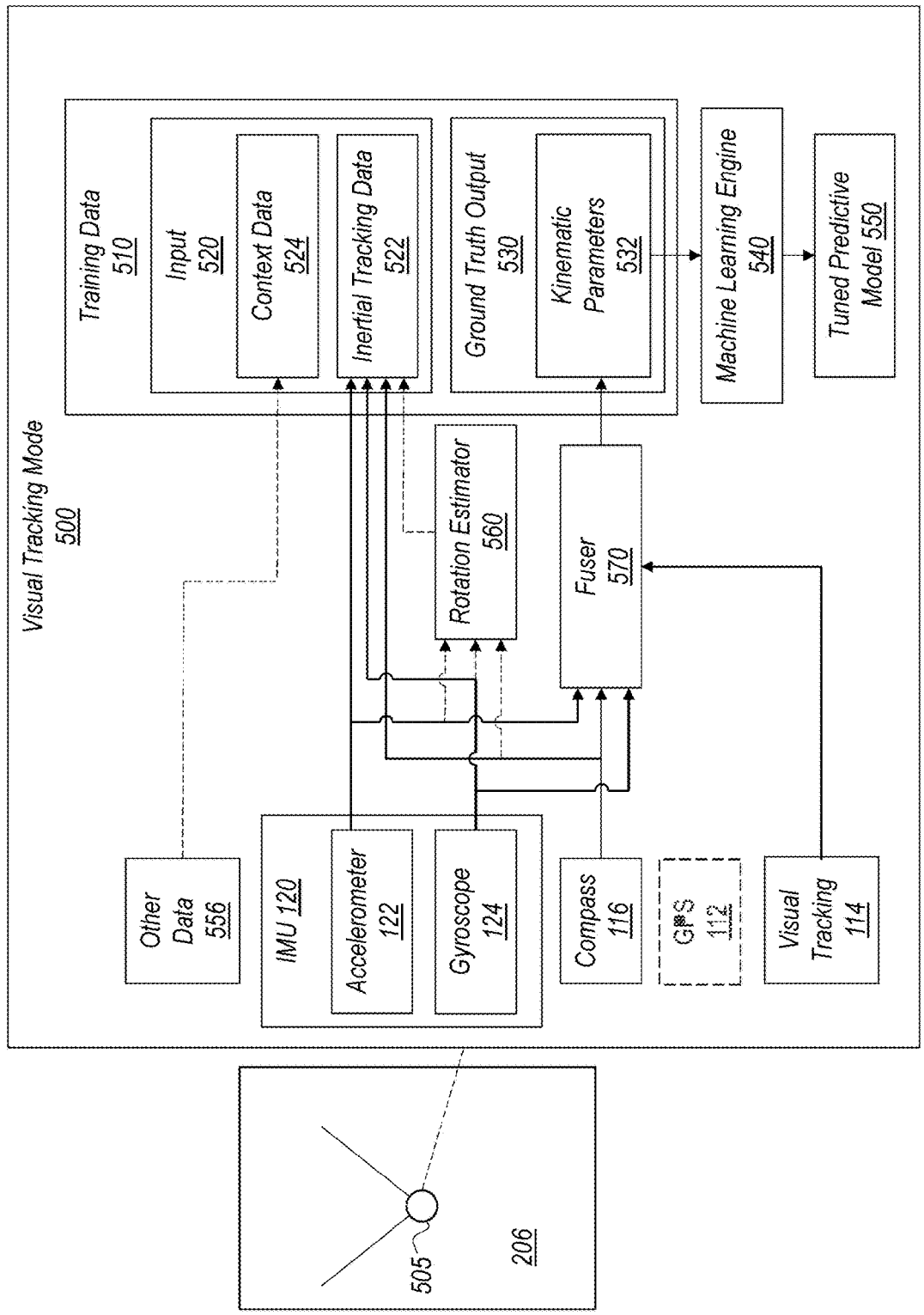
FIG. 5 illustrates an example architecture for a visual tracking mode for tuning a predictive model for use in the pedestrian dead reckoning mode, as well as a conceptual representation of an environment in which a visual tracking mode can be enabled.
Figure 6:
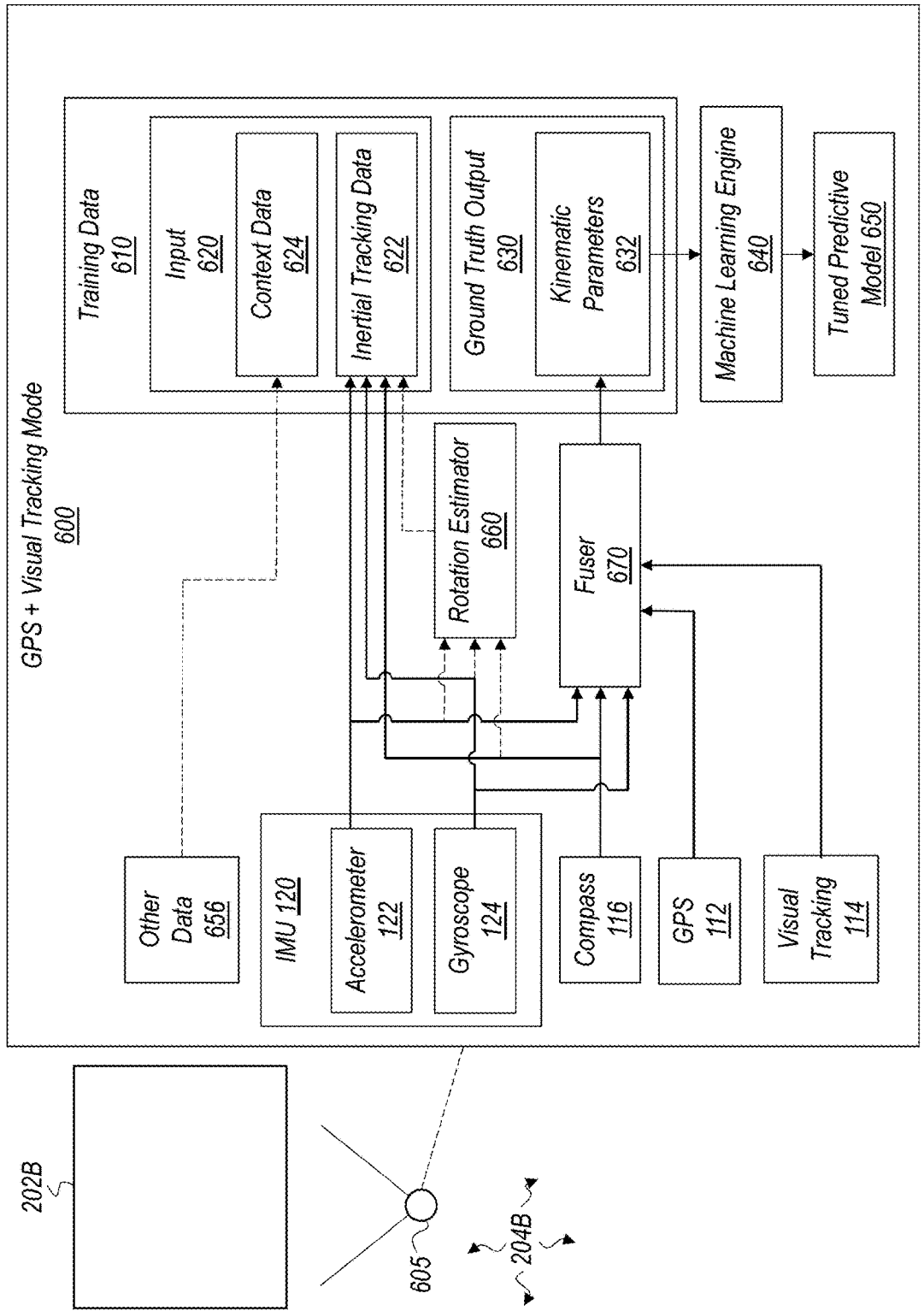
FIG. 6 illustrates an example architecture for a GPS and visual tracking mode for tuning a predictive model for use in the pedestrian dead reckoning mode, as well as a conceptual representation of an environment in which a GPS and visual tracking mode can be enabled.

FIGS. 4-6 illustrate various modes of operation for a computing device (e.g., HMD 100) of the present disclosure. In particular, FIGS. 4-6 illustrate various exteroceptive sensor modes (e.g., GPS mode 400, visual tracking mode 500, GPS and visual tracking mode 600) that enable the computing device to obtain exteroceptive sensor data (e.g., radio-based positioning data, visual tracking data) for use in further training/tuning a predictive model to individualize a predictive model for a particular user, computing device, and/or user activity.

FIG. 4 illustrates an example architecture for a GPS mode 400 for tuning the predictive model 250 to generate a tuned predictive model 450 for a computing device of a user 405 for use in the PDR mode 300, as well as a conceptual representation of an environment (e.g., an outdoor environment 204B, or another environment in which GPS is reliable) in which a GPS mode 400 can be enabled.

A computing device can enable the GPS mode 300 based on a variety of criteria/triggering conditions. For example, a computing device can selectively enable the GPS mode 400 upon determining that radio-based positioning data obtained by a radio-based positioning system (e.g., GPS 112) of the computing device is available for use to create a tuned predictive model 450 (e.g., by detecting that the GPS 112 is turned on).

In some implementations, the system determines that radio-based positioning data is available by detecting that the radio-based positioning data from the radio-based positioning system has a signal quality or confidence level that is above a threshold value. For instance, a computing device could identify one or more thresholds for a signal to noise ratio, a number of GNSS formats available to the computing device, the radio frequency bands employed by the computing device for radio-based positioning, antenna characteristics, a number of simultaneous GNSS receive channels available to the computing device (e.g., the number of satellites in view), the positioning of the satellites in view, etc. The thresholds can depend on multiple factors, and different thresholds can be established for different operational modes, depending, for example, on the algorithm used in the radio-based positioning system (e.g., unscented Kalman filter, alpha-beta filter, position averaging filter, one-dimensional Kalman filter), the type of error correction algorithm(s) employed by the system. In response to determining that one or more thresholds is met or exceeded, the computing device can enable the GPS mode 400.

In other instances, the computing device activates the GPS mode 400 in response to user input directed to explicitly activating the GPS mode 400, in response to detected battery conditions, user profile settings, etc. For instance, a computing device can detect a user 405 that has not previously used a particular computing device (e.g., by detecting a user login with a different user profile) and thereby enable the GPS mode 400 to further tune the predictive model 450 of the particular computing device to the new user. In other instances, the computing device can detect that a user 405 is engaging in a new activity on which the predictive model 250/450 has not been trained, and thereby enable the GPS mode to further tune the predictive model 450 based on the new activity.

FIG. 4 illustrates a visual tracking system 114 with dashed lines and partially faded text, indicating that the computing device can either include a visual tracking system 114 or omit a visual tracking system 114 according to the embodiments depicted in FIG. 4.

Upon the GPS mode 400 becoming enabled, the computing device can obtain radio-based positioning data from the GPS 112. The radio-based positioning data can include, for example, position measurements, velocity measurements, pseudo-range measurements, Doppler measurements, and/or carrier phase measurements.

The radio-based positioning data can be combined with inertial tracking data and/or other information to provide training data 410 for generating a tuned predictive model 450 with a machine learning engine 440. For example, under GPS/INS as described hereinabove, the radio-based positioning data obtained by the GPS 112 can be fused with inertial tracking data obtained by the accelerometer 122, gyroscope 124, and/or compass to provide kinematic parameters 432 for the computing device (e.g., 3DOF velocity), as illustrated in FIG. 4 by the solid arrows extending between the fuser 470 and the GPS 112, compass 116, accelerometer 122, and gyroscope 124. The kinematic parameters 432 can operate as ground truth output 430 for tuning the tuned predictive model 450 (as indicated in FIG. 4 by the solid arrow extending between the fuser 470 and the kinematic parameters 432 of the ground truth output 430 of the training data 410).

FIG. 4 also shows that any combination of inertial tracking data 422 obtained by the accelerometer 122, gyroscope 124, and/or compass 116 can be utilized as input data 420 for tuning/further training the tuned predictive model 450 with the machine learning engine 440 (as indicated by the solid arrows extending between the inertial tracking data 422 of the input data 420 of the training data 410 and the accelerometer 122, gyroscope 124, and compass 116). FIG. 4 also illustrates that the inertial tracking data 422 can include an estimated 3DOF rotation provided by a rotation estimator 460, as indicated by the dashed line extending between the rotation estimator 460 and the inertial tracking data 422. The estimated 3DOF rotation provided by the rotation estimator 460 can be based on data received from the accelerometer 122, gyroscope 124, and/or compass 116, as indicated in FIG. 4 by the dashed lines extending between the rotation estimator 460 and the accelerometer 122, gyroscope 124, and compass 116.

Additionally, FIG. 4 shows that the input data 420 of the training data 410 for tuning the predictive model 450 can include other data 456, such as user activity context, attributes of the user 405, hardware attributes of the computing device, etc. (as indicated by the dashed arrow extending between the context data 424 of the input data 420 and the other data 456).

FIG. 4 illustrates that the training data 410 can be provided to a machine learning engine 440 for further training the pre-trained predictive model 250 to generate a tuned predictive model 450. In some implementations, the training/tuning is accomplished using variants of stochastic gradient descent as optimization algorithms. Those skilled in the art will appreciate, in view of the present disclosure, that the machine learning engine 440 can operate on-device (i.e., on the computing device that obtains the inertial tracking data and/or radio-based positioning data) to generate the tuned predictive model 450. For example, in some instances, the limited depth of the neural network and low dimensionality of inertial tracking data permits training and inference to run on-device. In some instances, the machine learning engine 440 trains the tuned predictive model 450 upon acquisition of training data 410 (e.g., as training data 410 is received near-real-time). In other instances, the machine learning engine 440 trains the tuned predictive model under predefined time intervals and/or under predefined conditions (e.g., in response to user input, when the computing device is charging, shutting down, and/or booting up, etc.)

In some implementations, the machine learning engine 440 operates off-device (i.e., on a remote system, server, and/or cloud network) to generate the tuned predictive model 450. For instance, the computing device can transmit the training data 410 to a remote system, server, and/or cloud network (e.g., Microsoft Azure) at regular intervals and/or under predefined conditions to train the tuned predictive model 450. The computing device can then receive the tuned predictive model 450 from the remote system at regular intervals and/or under predefined conditions.

The tuned predictive model 450 can become associated with a particular user. For instance, the tuned predictive model 450 can become associated with a user profile of the user 405 that operated the computing device that obtained the training data 410 for training the tuned predictive model 450, thereby allowing the tuned predictive model 450 to become tailored to particular gait parameters and/or other physical attributes of an individual (e.g., if a user has a permanent injury that affects their gait parameters, the tuned predictive model 450 can adapt to the user's atypical gait parameters).

The tuned predictive model 450 can additionally, or alternatively, become associated with the computing device that obtains the training data 410. In other instances, the tuned predictive model can become associated with a particular user activity. For example, a single user profile can have several tuned predictive models associated therewith, each corresponding to different user activities that the user may engage in (e.g., running, walking, dancing, performing group training exercises, etc.).

Accordingly, a computing device can employ a GPS mode 400 to generate a tuned predictive model 450 by further training the pre-trained predictive model 250 to learn the per-unit characteristics of the accelerometer 122, gyroscope 124, and/or the compass 116 in concert, thereby improving system performance.

Furthermore, any portion of the training data 410 obtained by any particular computing device (e.g., the computing device employed by user 405) can be utilized to further train the pre-trained predictive model 250 described hereinabove with reference to FIG. 2.

In response to determining that the triggering conditions for enabling the GPS mode 400 are no longer present, a computing device can selectively disable the GPS mode 400 to refrain from tuning the tuned predictive model 450 (e.g., thereafter enabling/activating the PDR mode 300, a visual tracking mode 500, a GPS and visual tracking mode 600, or another mode of operation).

FIG. 5 illustrates an example architecture for a visual tracking mode 500 for tuning the predictive model 250 to generate a tuned predictive model 550 for a computing device of a user 505 for use in the PDR mode 300, as well as a conceptual representation of an environment (e.g., an indoor environment 206, or another environment in which visual tracking is reliable) in which a visual tracking mode 500 can be enabled.

As with the GPS mode 300 described above, a computing device can enable the visual tracking mode 500 based on a variety of criteria/triggering conditions. For example, a computing device can selectively enable the visual tracking mode 500 upon determining that visual tracking data obtained by a visual tracking system 114 of the computing device is available for use to create a tuned predictive model 550 (e.g., by detecting that the visual tracking system 114 is turned on).

In some implementations, the system determines that visual tracking data is available by detecting that the visual tracking data from the visual tracking system has a signal quality or precision value that is above a threshold value. For instance, a computing device could identify one or more thresholds for a signal to noise ratio, a number of anchor points, a transience/stability attribute of a scene, an ambient light level, etc. The thresholds can depend on multiple factors, and different thresholds can be established for different operational modes. In response to determining that one or more thresholds is met or exceeded, the computing device can enable the visual tracking mode 500.

The computing device can activate the visual tracking mode 500 in response to user input directed to explicitly activating the visual tracking mode 500, in response to detected battery conditions, user profile settings, etc. For instance, a computing device can detect a user 505 that has not previously used a particular computing device (e.g., by detecting a user login with a different user profile) and thereby enable the visual tracking mode 500 to further tune the predictive model 550 of the particular computing device to the new user. In other instances, the computing device can detect that a user 505 is engaging in a new activity on which the predictive model 250/550 has not been trained, and thereby enable the visual tracking mode 500 to further tune the predictive model 550 based on the new activity.

FIG. 5 illustrates a GPS 112 with dashed lines and partially faded text, indicating that the computing device can either include a GPS 112 or omit a GPS 112 according to the embodiments depicted in FIG. 5.

Upon the visual tracking mode 500 becoming enabled, the computing device can obtain visual tracking data from the visual tracking system 114, such as head tracking data. The visual tracking data can be combined with inertial tracking data and/or other information to provide training data 510 for generating a tuned predictive model 550 with a machine learning engine 540. For example, under visual-inertial navigation as described hereinabove, the visual tracking data obtained by the visual tracking system 114 can be fused with inertial tracking data obtained by the accelerometer 122, gyroscope 124, and/or compass to provide kinematic parameters 532 for the computing device (e.g., 3DOF velocity), as illustrated in FIG. 5 by the solid arrows extending between the fuser 570 (e.g., pose filter) and the visual tracking system 114, compass 116, accelerometer 122, and gyroscope 124. The kinematic parameters 532 can operate as ground truth output 530 for tuning the tuned predictive model 550 (as indicated in FIG. 5 by the solid arrow extending between the fuser 570 and the kinematic parameters 532 of the ground truth output 530 of the training data 510).

Similar to the description hereinabove referring to the GPS mode 400, FIG. 5 also shows that any combination of inertial tracking data 522 obtained by the accelerometer 122, gyroscope 124, and/or compass 116 can be utilized as input data 520 for tuning/further training the tuned predictive model 550 with the machine learning engine 540 (as indicated by the solid arrows extending between the inertial tracking data 522 of the input data 520 of the training data 510 and the accelerometer 122, gyroscope 124, and compass 116).

FIG. 5 also illustrates that the inertial tracking data 522 can include an estimated 3DOF rotation provided by a rotation estimator 560, as indicated by the dashed line extending between the rotation estimator 560 and the inertial tracking data 522. FIG. 5 also shows that the input data 520 of the training data 510 can include other data 556, providing context data 524 (e.g., user activity context, attributes of the user 505, hardware attributes of the computing device, etc.).

Similar to the description hereinabove referring to FIG. 4, FIG. 5 shows that the training data 510 can be provided to a machine learning engine 540 for further training the pre-trained predictive model 250 to generate a tuned predictive model 550. The machine learning engine 540 can operate on-device and/or off-device to accomplish the training of the tuned predictive model 550. The tuned predictive model 550 can become associated with a particular user (e.g., user 505), user activity, and/or computing device.

Accordingly, a computing device can employ a visual tracking mode 500 to generate a tuned predictive model 550 by further training the pre-trained predictive model 250 to learn the per-unit characteristics of the accelerometer 122, gyroscope 124, and/or the compass 116 in concert, thereby improving system performance.

Furthermore, any portion of the training data 510 obtained by any particular computing device (e.g., the computing device employed by user 505) can be utilized to further train the pre-trained predictive model 250 described hereinabove with reference to FIG. 2.

In response to determining that the triggering conditions for enabling the visual tracking mode 500 are no longer present, a computing device can selectively disable the visual tracking mode 500 to refrain from tuning the tuned predictive model 550 (e.g., thereafter enabling/activating the PDR mode 300, the GPS mode 400, a GPS and visual tracking mode 600, or another mode of operation).

FIG. 6 illustrates an example architecture for a GPS and visual tracking mode 600 for tuning a predictive model 650 for use in the pedestrian dead reckoning mode, as well as a conceptual representation of an environment in which a GPS and visual tracking mode can be enabled;

FIG. 6 illustrates an example architecture for a GPS and visual tracking mode 600 for tuning the predictive model 250 to generate a tuned predictive model 650 for a computing device of a user 605 for use in the PDR mode 300, as well as a conceptual representation of an environment (e.g., an outdoor environment 204B with a view of textured exterior of building 202B, or another environment in which visual tracking and GPS are reliable) in which a GPS and visual tracking mode 600 can be enabled.

A computing device can enable the GPS and visual tracking mode 600 based on any combination of criteria/triggering conditions, including those described hereinabove referring to the GPS mode 400 or the visual tracking mode 500 (both of which comprise exteroceptive sensor modes). FIG. 6 illustrates a GPS 112 and a visual tracking system 114 with solid lines and text, indicating that the computing device will include both a GPS 112 and a visual tracking system 114 according to the embodiments depicted in FIG. 6.

Upon the GPS and visual tracking mode 600 becoming enabled, the computing device can obtain visual tracking data from the visual tracking system 114 as well as radio-based positioning data from the GPS 112. The visual tracking data and the radio-based positioning data can be combined with inertial tracking data and/or other information to provide training data 610 for generating a tuned predictive model 650 with a machine learning engine 640. For example, the computing device can operate under visual-inertial navigation in combination with GPS/INS as described hereinabove, fusing the visual tracking data and the radio-based positioning data with inertial tracking data obtained by the accelerometer 122, gyroscope 124, and/or compass to provide kinematic parameters 632 for the computing device (e.g., 3DOF velocity), as illustrated in FIG. 6 by the solid arrows extending between the fuser 670 and the visual tracking system 114, GPS 112, compass 116, accelerometer 122, and gyroscope 124. The kinematic parameters 632 can operate as ground truth output 630 for tuning the tuned predictive model 650 (as indicated in FIG. 6 by the solid arrow extending between the fuser 670 and the kinematic parameters 632 of the ground truth output 630 of the training data 610).

Similar to the descriptions hereinabove referring to the GPS mode 400 and the visual tracking mode 500, FIG. 6 also shows that any combination of inertial tracking data 622 obtained by the accelerometer 122, gyroscope 124, and/or compass 116 can be utilized as input data 620 for tuning/further training the tuned predictive model 650 with the machine learning engine 640 (as indicated by the solid arrows extending between the inertial tracking data 622 of the input data 620 of the training data 610 and the accelerometer 122, gyroscope 124, and compass 116). FIG. 6 also illustrates that the inertial tracking data 622 can include an estimated 3DOF rotation provided by a rotation estimator 660, as indicated by the dashed line extending between the rotation estimator 660 and the inertial tracking data 622. FIG. 6 also shows that the input data 620 of the training data 610 can include other data 656, providing context data 624 (e.g., user activity context, attributes of the user 605, hardware attributes of the computing device, etc.).

Similar to the description hereinabove referring to FIGS. 4 and 5, FIG. 6 shows that the training data 610 can be provided to a machine learning engine 640 for further training the pre-trained predictive model 250 to generate a tuned predictive model 650. The machine learning engine 640 can operate on-device and/or off-device to accomplish the training of the tuned predictive model 650. The tuned predictive model 650 can become associated with a particular user (e.g., user 605), user activity, and/or computing device.

Accordingly, a computing device can employ a GPS and visual tracking mode 600 to generate a tuned predictive model 650 by further training the pre-trained predictive model 250 to learn the per-unit characteristics of the accelerometer 122, gyroscope 124, and/or the compass 116 in concert, thereby improving system performance.

Furthermore, any portion of the training data 610 obtained by any particular computing device (e.g., the computing device employed by user 605) can be utilized to further train the pre-trained predictive model 250 described hereinabove with reference to FIG. 2.

In response to determining that the triggering conditions for enabling the GPS and visual tracking mode 600 are no longer present, a computing device can selectively disable the GPS and visual tracking mode 600 to refrain from tuning the tuned predictive model 650 (e.g., thereafter enabling/activating the PDR mode 300, the GPS mode 400, the visual tracking mode 500, or another mode of operation). Accordingly, the device can and will, in some instances, selectively and dynamically switch back and forth between the different modes based on the detected presence of corresponding triggering conditions.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

FIGS. 7-12 show flow diagrams providing various acts associated with methods for tracking trajectory of computing devices. The discussion of the various acts represented in the flow diagrams include references to various hardware components described in more detail with reference to FIGS. 1 and 13.

Figure 7:
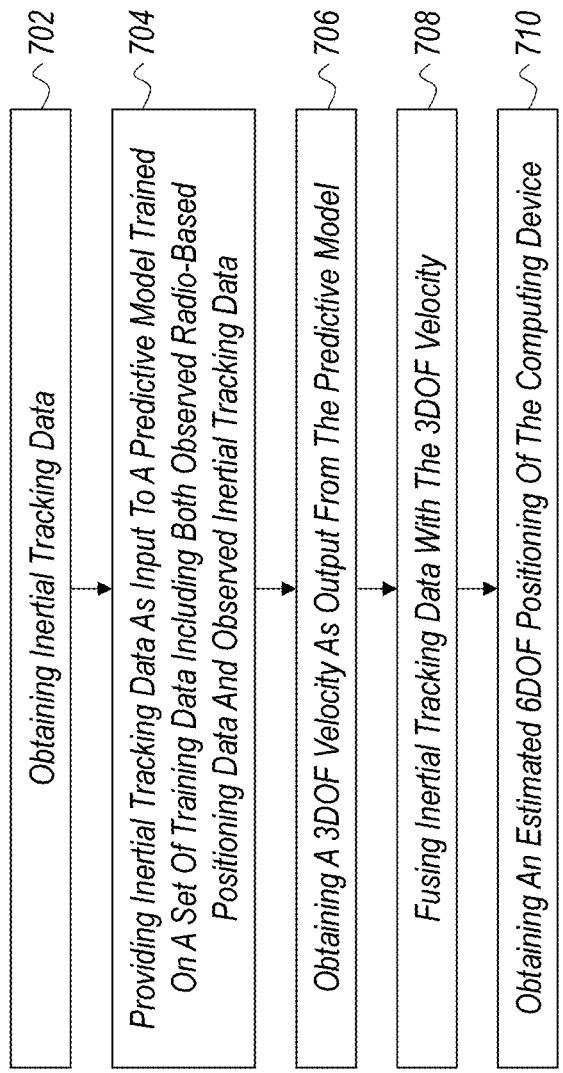
FIG. 7 illustrates an example flow diagram depicting a method for estimating six degree of freedom (6DOF) positioning of a computing device while the computing device is in a pedestrian dead reckoning mode by using inertial tracking data and a predictive model trained on both observed radio-based positioning data and inertial tracking data, according to one or more implementations of the present disclosure.

FIG. 7 illustrates an example flow diagram 700 depicting a method for estimating six degree of freedom (6DOF) positioning of a computing device while the computing device is in a PDR mode (e.g., PDR mode 300) by using inertial tracking data and a predictive model trained on both observed radio-based positioning data and inertial tracking data.

The first illustrated act is obtaining inertial tracking data (act 702). In some instances, a computing device (e.g., HMD 100) employs inertial tracking components including an IMU 120 including an accelerometer 122 and a gyroscope 124 and/or a compass 116 to perform act 702. The inertial tracking data can include acceleration data obtained by the accelerometer 122, angular velocity data obtained by the gyroscope 124, and/or heading data obtained by the compass 116.

The second illustrated act is an act of providing inertial tracking data as input to a predictive model trained on a set of training data including both observed radio-based positioning data and observed inertial tracking data (act 704). A computing device can employ a processor(s) 1305, machine learning engine 1310, and/or any other computing center described herein to carry out act 704. In some instances, the inertial tracking data provided to the predictive model includes acceleration data and angular velocity data obtained by the accelerometer 122 and the gyroscope 124, respectively. The first subset of inertial tracking data can also include a 3DOF rotation 354 generated by a rotation estimator 360.

The set of training data upon which the predictive model was trained can include training data provided by one or more specific users using one or more specific computing devices. The training data can include metadata indicating a hardware attribute of the specific computing device and a user activity and/or user class associated with the specific user.

The third illustrated act is an act of obtaining a 3DOF velocity as output from the predictive model (act 706). A computing device can employ a processor(s) 1305, machine learning engine 1310, and/or any other computing center described herein to carry out act 706. In some implementations, the predictive model corresponds to the pre-trained predictive model 250, or a tuned predictive model 450, being trained on radio-based positioning data and inertial tracking data observed for one or more users to estimate 3DOF velocity based on inertial tracking data input.

The fourth illustrated act is an act of fusing inertial tracking data with the 3DOF velocity (act 708). A computing device can employ a processor(s) 1305, machine learning engine 1310, and/or any other computing center described herein to carry out act 708. The data that becomes fused with the 3DOF velocity can be based on a set of inertial tracking data obtained by the inertial tracking components (e.g., IMU 120, compass 116). For instance, a 3DOF rotation can 354 can become fused with the 3DOF velocity 352. Data from the IMU 120 and/or compass 116 can also or alternatively become fused with the 3DOF velocity.

The fifth illustrated act is an act of obtaining an estimated 6DOF positioning of the computing device (act 710). A computing device can employ a processor(s) 1305, machine learning engine 1310, and/or any other computing center described herein to carry out act 710. The 6DOF positioning can be obtained as fusion/integration output from fusing the 3DOF velocity with inertial tracking data and/or other information based on the inertial tracking data.

Figure 8:
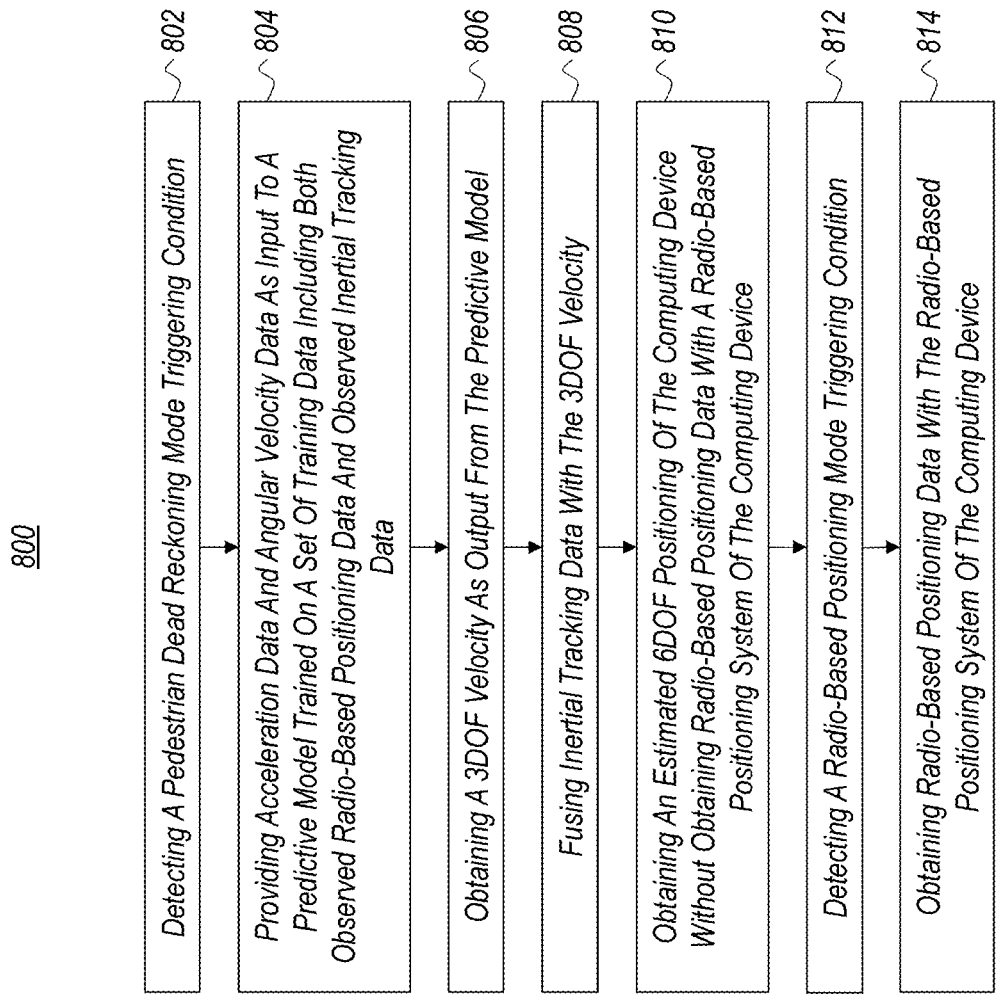
FIG. 8 illustrates another example flow diagram depicting a method for estimating 6DOF positioning of a computing device while the computing device is in a pedestrian dead reckoning mode and switching to a radio-based positioning mode, according to one or more implementations of the present disclosure.

FIG. 8 illustrates another example flow diagram 800 depicting a method for estimating 6DOF positioning of a computing device while the computing device is in a pedestrian dead reckoning mode and switching to a radio-based positioning mode.

The first illustrated act is an act of detecting a PDR mode triggering condition (act 802). A computing device can employ a processor(s) 1305, machine learning engine 1310, and/or any other computing center described herein, optionally in combination with any sensor 110, 1340, 1365 described herein, to carry out act 802. In some implementations, the PDR mode triggering condition includes detecting that radio-based positioning data from the radio-based positioning system (e.g., GPS 112) has a signal quality or confidence level that is below a threshold value.

The second illustrated act is an act of providing acceleration data and angular velocity data as input to a predictive model trained on a set of training data including both observed radio-based positioning data and observed inertial tracking data (act 804). A computing device can employ any processing/computing center described herein and the accelerometer 122 and gyroscope 124 to perform act 804.

The set of training data upon which the predictive model was trained can include training data provided by one or more specific users using one or more specific computing devices. The training data can include metadata indicating a hardware attribute of the specific computing device and a user activity and/or user class associated with the specific user.

The third illustrated act is an act of obtaining a 3DOF velocity as output from the predictive model (act 806). A computing device can employ a processor(s) 1305, machine learning engine 1310, and/or any other computing center described herein to carry out act 806. In some implementations, the predictive model corresponds to the pre-trained predictive model 250, or a tuned predictive model 450, being trained on radio-based positioning data and inertial tracking data observed for one or more users to estimate 3DOF velocity based on inertial tracking data input.

The fourth illustrated act is an act of fusing inertial tracking data with the 3DOF velocity (act 808). A computing device can employ a processor(s) 1305, machine learning engine 1310, and/or any other computing center described herein to carry out act 808. The data that becomes fused with the 3DOF velocity can be based on a set of inertial tracking data obtained by the inertial tracking components (e.g., IMU 120, compass 116). For instance, a 3DOF rotation can 354 can become fused with the 3DOF velocity 352. Data from the IMU 120 and/or compass 116 can also or alternatively become fused with the 3DOF velocity.

The fifth illustrated act is obtaining an estimated 6DOF positioning of the computing device without obtaining radio-based positioning data with a radio-based positioning system of the computing device (act 810). A computing device can employ a processor(s) 1305, machine learning engine 1310, and/or any other computing center described herein to carry out act 810. The 6DOF positioning can be obtained as fusion/integration output from fusing the 3DOF velocity with inertial tracking data and/or other information based on the inertial tracking data.

The sixth illustrated act is an act of detecting a radio-based positioning mode triggering condition (act 812). A computing device can employ a processor(s) 1305, machine learning engine 1310, and/or any other computing center described herein, optionally in combination with any sensor 110, 1340, 1365 described herein, to carry out act 812. In some implementations, the radio-based positioning mode (e.g., GPS mode 400) triggering condition includes detecting that radio-based positioning data from the radio-based positioning system (e.g., GPS 112) has a signal quality or confidence level that is above a threshold value.

The seventh illustrated act is an act of obtaining radio-based positioning data with the radio-based positioning system of the computing device (act 814). A computing device can employ a GPS 112 and/or any other radio-based positioning system to perform act 814. The radio-based positioning data can include one or more of: position measurements, velocity measurements, pseudo-range measurements, Doppler measurements, and/or carrier phase measurements.

Figure 9:
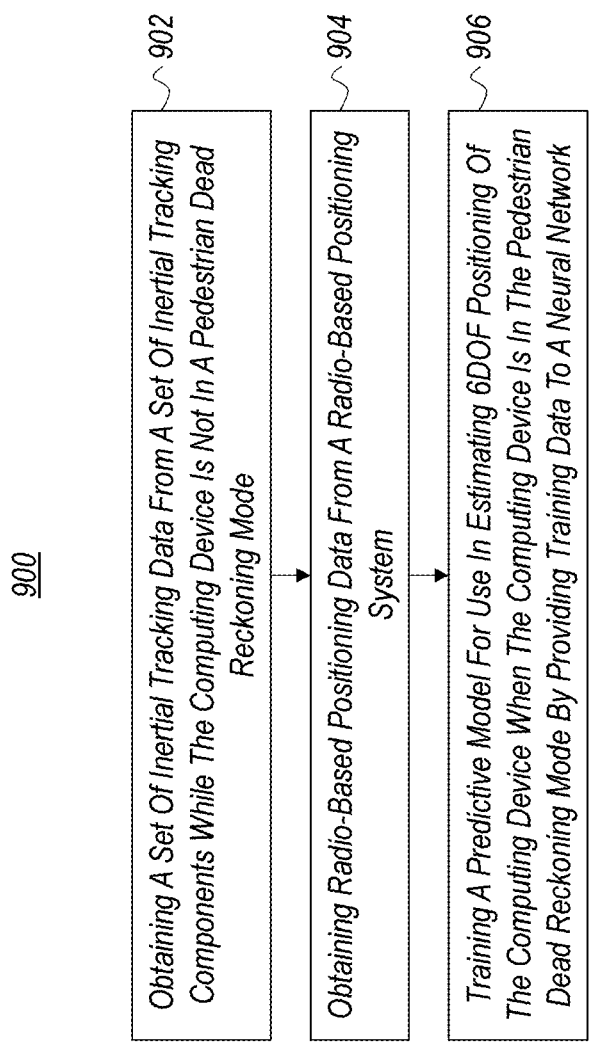
FIG. 9 illustrates an example flow diagram depicting a method for providing training data to a neural network for training a predictive model for use in estimating 6DOF positioning of a computing device while the computing device is in a pedestrian dead reckoning mode, according to one or more implementations of the present disclosure.

FIG. 9 illustrates an example flow diagram 900 depicting a method for providing training data to a neural network for training a predictive model for use in estimating 6DOF positioning of a computing device while the computing device is in a pedestrian dead reckoning mode.

The first illustrated act is an act of obtaining a set of inertial tracking data from a set of inertial tracking components while the computing device is not in a pedestrian dead reckoning mode (act 902). In some instances, a computing device (e.g., HMD 100) employs inertial tracking components including an IMU 120 including an accelerometer 122 and a gyroscope 124 and/or a compass 116 to perform act 902.

The second illustrated act is an act of obtaining radio-based positioning data from a radio-based positioning system (act 904). A computing device can employ a GPS 112 and/or any other radio-based positioning system to perform act 904. The radio-based positioning data can include one or more of: position measurements, velocity measurements, pseudo-range measurements, Doppler measurements, and/or carrier phase measurements.

The third illustrated act is an act of training a predictive model for use in estimating 6DOF positioning of the computing device when the computing device is in the pedestrian dead reckoning mode by providing training data to a neural network (act 906). A computing device can employ a processor(s) 1305, machine learning engine 1310, and/or any other computing center described herein to carry out act 906. The predictive model is, in some instances, a tuned predictive model 450, as described herein. The training data used to train the model includes, in some instances, at least (1) the set of inertial tracking data as input and (2) at least a portion of the inertial tracking data fused with the radio-based positioning data as ground truth output. The trained predictive model will, in some instances, be trained/tuned for use with a particular user, computing device, and/or user activity. Further, the training data can be used to train any number of predictive models for any number of purposes.

Figure 10:
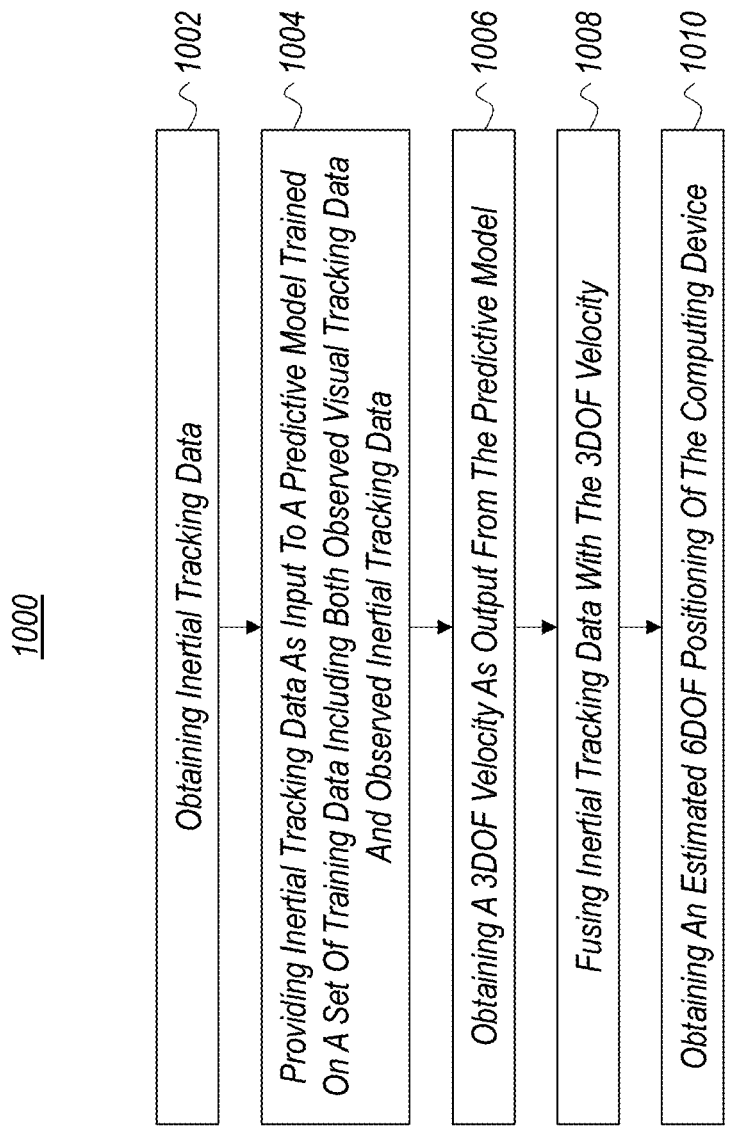
FIG. 10 illustrates an example flow diagram depicting a method for estimating six degree of freedom (6DOF) positioning of a computing device while the computing device is in a pedestrian dead reckoning mode by using inertial tracking data and a predictive model trained on both observed visual tracking data and inertial tracking data, according to one or more implementations of the present disclosure.

FIG. 10 illustrates an example flow diagram 1000 depicting a method for estimating six degree of freedom (6DOF) positioning of a computing device while the computing device is in a PDR mode (e.g., PDR mode 300) by using inertial tracking data and a predictive model trained on both observed visual tracking data and inertial tracking data.

The first illustrated act is an act of obtaining inertial tracking data (act 1002). In some instances, a computing device (e.g., HMD 100) employs inertial tracking components including an IMU 120 including an accelerometer 122 and a gyroscope 124 and/or a compass 116 to perform act 1002. The inertial tracking data can include acceleration data obtained by the accelerometer 122, angular velocity data obtained by the gyroscope 124, and/or heading data obtained by the compass 116.

The second illustrated act is an act of providing inertial tracking data as input to a predictive model trained on a set of training data including both observed visual tracking data and observed inertial tracking data (act 1004). A computing device can employ a processor(s) 1305, machine learning engine 1310, and/or any other computing center described herein to carry out act 1004. In some instances, the inertial tracking data provided to the predictive model includes acceleration data and angular velocity data obtained by the accelerometer 122 and the gyroscope 124, respectively. The first subset of inertial tracking data can also include a 3DOF rotation 354 generated by a rotation estimator 360.

The set of training data upon which the predictive model was trained will include, in some instances, training data provided by one or more specific users using one or more specific computing devices. The training data can include metadata indicating a hardware attribute of the specific computing device and a user activity and/or user class associated with the specific user.

The third illustrated act is an act of obtaining a 3DOF velocity as output from the predictive model (act 1006). A computing device can employ a processor(s) 1305, machine learning engine 1310, and/or any other computing center described herein to carry out act 1006. In some implementations, the predictive model corresponds to the pre-trained predictive model 250, or a tuned predictive model 550, being trained on visual tracking data and inertial tracking data observed for one or more users to estimate 3DOF velocity based on inertial tracking data input.

The fourth illustrated act is an act of fusing inertial tracking data with the 3DOF velocity (act 1008). A computing device can employ a processor(s) 1305, machine learning engine 1310, and/or any other computing center described herein to carry out act 1008. The data that becomes fused with the 3DOF velocity can be based on a set of inertial tracking data obtained by the inertial tracking components (e.g., IMU 120, compass 116). For instance, a 3DOF rotation can 354 can become fused with the 3DOF velocity 352. Data from the IMU 120 and/or compass 116 can also or alternatively become fused with the 3DOF velocity.

The fifth illustrated act is an act of obtaining an estimated 6DOF positioning of the computing device (act 1010). A computing device can employ a processor(s) 1305, machine learning engine 1310, and/or any other computing center described herein to carry out act 1010. The 6DOF positioning can be obtained as fusion/integration output from fusing the 3DOF velocity with inertial tracking data and/or other information based on the inertial tracking data.

Figure 11:
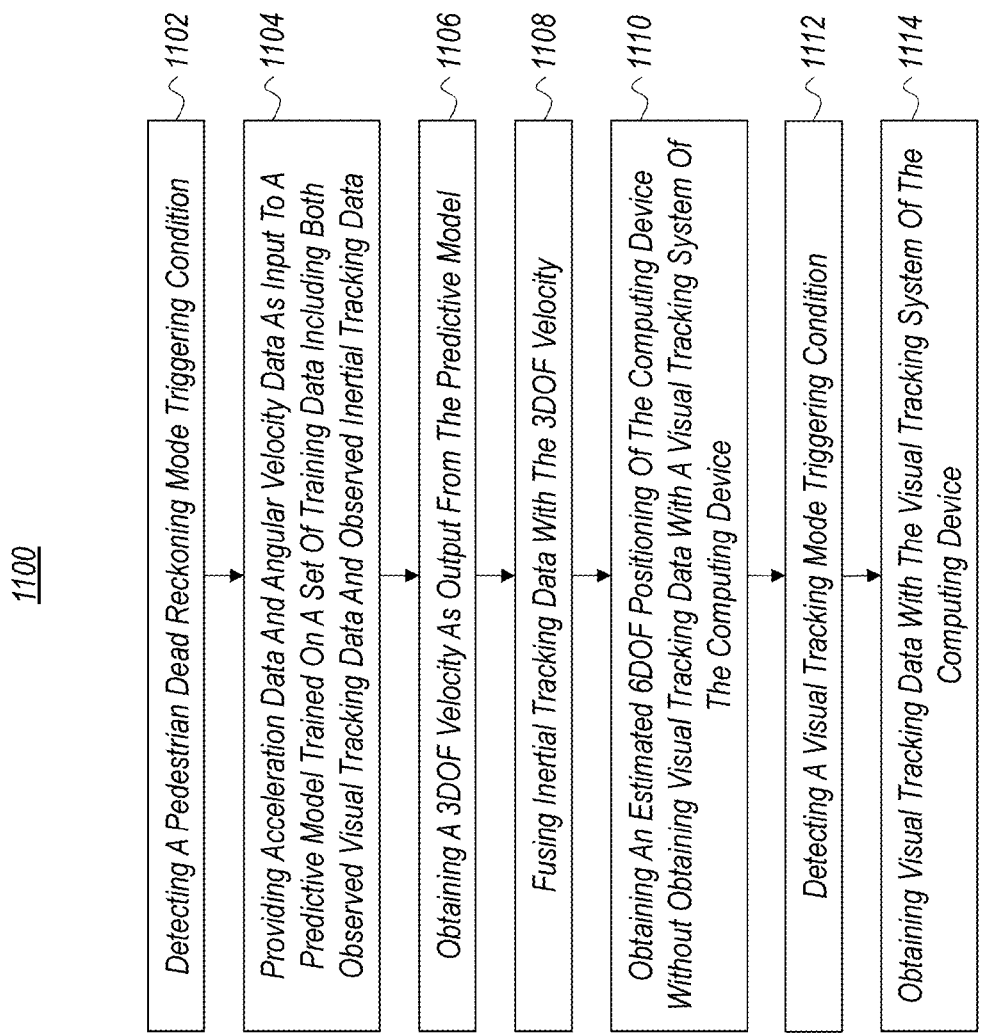
FIG. 11 illustrates another example flow diagram depicting a method for estimating 6DOF positioning of a computing device while the computing device is in a pedestrian dead reckoning mode and switching to a visual tracking mode, according to one or more implementations of the present disclosure.

FIG. 11 illustrates another example flow diagram 1100 depicting a method for estimating 6DOF positioning of a computing device while the computing device is in a pedestrian dead reckoning mode and switching to a visual tracking mode.

The first illustrated act is an act of detecting a PDR mode triggering condition (act 1102). A computing device can employ a processor(s) 1305, machine learning engine 1310, and/or any other computing center described herein, optionally in combination with any sensor 110, 1340, 1365 described herein, to carry out act 1102. In some implementations, the PDR mode triggering condition includes detecting that visual tracking data from the visual tracking system (e.g., visual tracking system 114) has a signal quality or precision value level that is below a threshold value.

The second illustrated act is an act of providing acceleration data and angular velocity data as input to a predictive model trained on a set of training data including both observed visual tracking data and observed inertial tracking data (act 1104). A computing device can employ any processing/computing center described herein and the accelerometer 122 and gyroscope 124 to perform act 1104.

The set of training data upon which the predictive model was trained is trained, according to some instances, to include training data provided by one or more specific users using one or more specific computing devices. The training data can include metadata indicating a hardware attribute of the specific computing device and a user activity and/or user class associated with the specific user.

The third illustrated act is an act of obtaining a 3DOF velocity as output from the predictive model (act 1106). A computing device can employ a processor(s) 1305, machine learning engine 1310, and/or any other computing center described herein to carry out act 1106. In some implementations, the predictive model corresponds to the pre-trained predictive model 250, or a tuned predictive model 550, being trained on visual tracking data and inertial tracking data observed for one or more users to estimate 3DOF velocity based on inertial tracking data input.

The fourth illustrated act is an act of fusing inertial tracking data with the 3DOF velocity (act 1108). A computing device can employ a processor(s) 1305, machine learning engine 1310, and/or any other computing center described herein to carry out act 1108. The data that becomes fused with the 3DOF velocity can be based on a set of inertial tracking data obtained by the inertial tracking components (e.g., IMU 120, compass 116). For instance, a 3DOF rotation can 354 can become fused with the 3DOF velocity 352. Data from the IMU 120 and/or compass 116 can also or alternatively become fused with the 3DOF velocity.

The fifth illustrated act is an act of obtaining an estimated 6DOF positioning of the computing device without obtaining visual tracking data with a visual tracking system of the computing device (act 1110). A computing device can employ a processor(s) 1305, machine learning engine 1310, and/or any other computing center described herein to carry out act 1110. The 6DOF positioning can be obtained as fusion/integration output from fusing the 3DOF velocity with inertial tracking data and/or other information based on the inertial tracking data.

The sixth illustrated act is an act of detecting a visual tracking mode triggering condition (act 1112). A computing device can employ a processor(s) 1305, machine learning engine 1310, and/or any other computing center described herein, optionally in combination with any sensor 110, 1340, 1365 described herein, to carry out act 1112. In some implementations, the visual tracking mode (e.g., visual tracking mode 500) triggering condition includes detecting that visual tracking data from the visual tracking system (e.g., visual tracking system 114) has a signal quality or precision value that is above a threshold value.

The seventh illustrated act is an act of obtaining visual tracking data with the visual tracking system of the computing device (act 1114). A computing device can employ a visual tracking system 114 to perform act 1114. The visual tracking data can include, for example, head tracking data and, optionally, depth tracking data.

Figure 12:
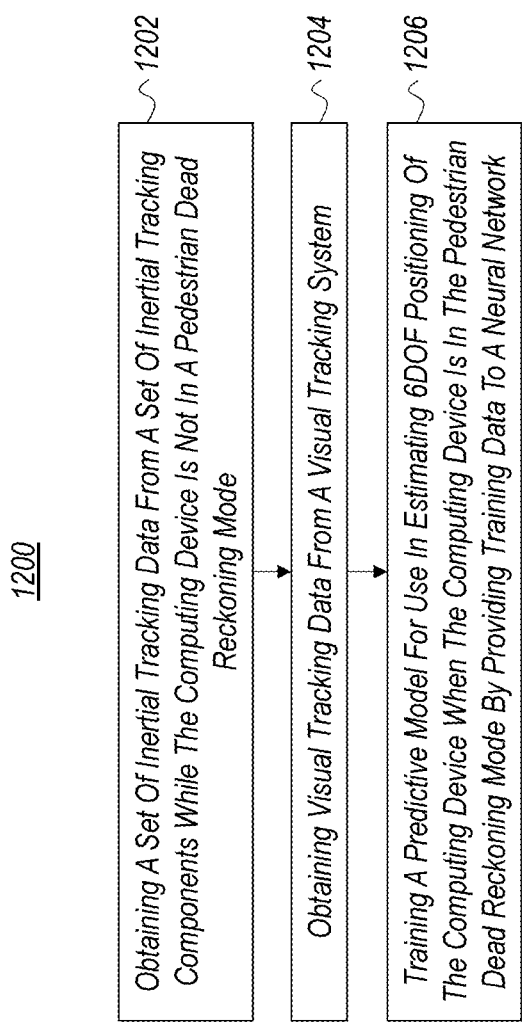
FIG. 12 illustrates an example flow diagram depicting a method for providing training data to a neural network for training a predictive model for use in estimating 6DOF positioning of a computing device while the computing device is in a pedestrian dead reckoning mode, according to one or more implementations of the present disclosure.

FIG. 12 illustrates an example flow diagram 1200 depicting a method for providing training data to a neural network for training a predictive model for use in estimating 6DOF positioning of a computing device while the computing device is in a pedestrian dead reckoning mode.

The first illustrated act is an act of obtaining a set of inertial tracking data from a set of inertial tracking components while the computing device is not in a pedestrian dead reckoning mode (act 1202). In some instances, a computing device (e.g., HMD 100) employs inertial tracking components including an IMU 120 including an accelerometer 122 and a gyroscope 124 and/or a compass 116 to perform act 1202.

The second illustrated act is an act of obtaining visual tracking data from a visual tracking system (act 1204). A computing device can employ a visual tracking system 114 to perform act 1204. The visual tracking data can include, for example, head tracking data and, optionally, depth tracking data.

The third illustrated act is an act of training a predictive model for use in estimating 6DOF positioning of the computing device when the computing device is in the pedestrian dead reckoning mode by providing training data to a neural network (act 1206). A computing device can employ a processor(s) 1305, machine learning engine 1310, and/or any other computing center described herein to carry out act 1206. The predictive model can correspond to a tuned predictive model 550 as described herein. The training data can include at least (1) the set of inertial tracking data as input and (2) at least a portion of the inertial tracking data fused with the visual tracking data as ground truth output. The trained predictive model can become associated with a particular user, computing device, and/or user activity by using data from those users/activities to further train the predictive model. Accordingly, the training data can be used to train any number of predictive models for any number of purposes.

As will be appreciated from the foregoing, the disclosed embodiments can be used to help improve the accuracy and effectiveness of estimating device trajectories for mobile devices, particularly, when the exteroceptive sensors of the devices are unreliable, unavailable and/or undesired, and by using trained predictive models in combination with basic inertial inputs of the devices. Disclosed devices and methods are configured, in some instances, for example, to selectively switch between dead reckoning modes (i.e., PDR mode) and exteroceptive sensor modes of the devices (e.g., visual tracking mode and GPS/radio-based positioning mode). Notably, the exteroceptive sensor modes rely on exteroceptive sensor data (e.g., visual tracking sensor data and GPS/radio-based positioning sensor data) and the devices selectively switch between the different PDR and exteroceptive sensor modes based on detecting the presence and/or absence of exteroceptive sensor mode triggering conditions (e.g., visual tracking mode triggering conditions and GPS/radio-based positioning mode triggering conditions).

Those skilled in the art will recognize that an estimated 6DOF positioning can be used for a variety of purposes and practical applications, such as, for example, rendering mixed-reality scenes, providing information about an activity of a user that is using the computing device, providing and/or supplementing user navigation functionality, and/or providing the estimated trajectory 380 (6DOF pose) for one user to one or more other computing devices/users.

Figure 13:
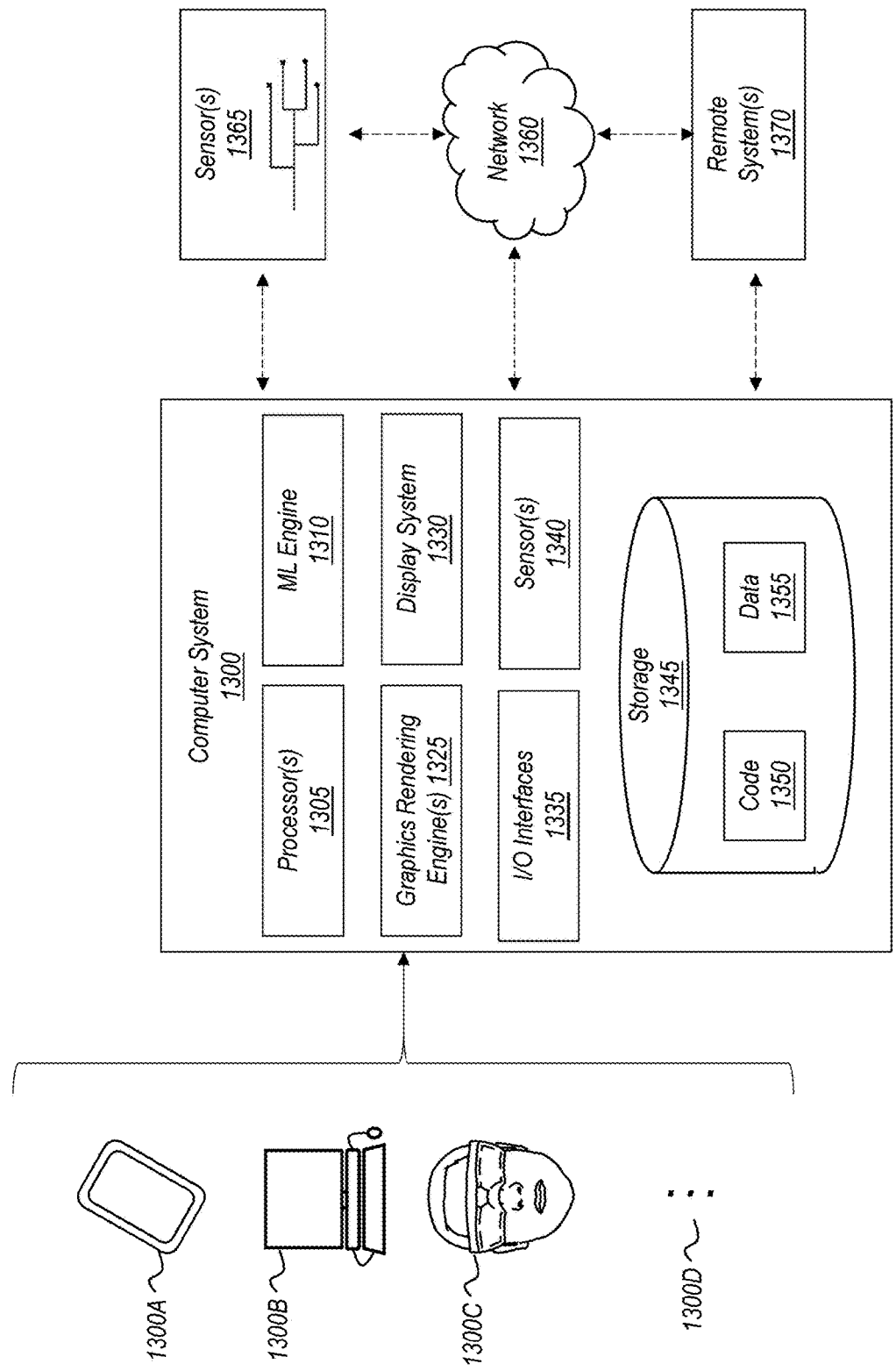
FIG. 13 illustrates an example computer system and components thereof that may comprise, be incorporated with, and/or be used to implement one or more operations disclosed herein.

Having just described the various features and functionalities of some of the disclosed embodiments, the focus will now be directed to FIG. 13 which illustrates an example computer system 1300 that may be used to facilitate the operations described herein. In particular, this computer system 1300 may be implemented as part of a mixed-reality HMD (e.g., HMD 100), as noted hereinabove.

Computer system 1300 may take various different forms. For example, computer system 1300 may be embodied as a tablet, a desktop, a laptop, a mobile device, a cloud device, an HMD, or a standalone device, such as those described throughout this disclosure. Computer system 1300 may also be a distributed system that includes one or more connected computing components/devices that are in communication with computer system 1300. FIG. 13 specifically calls out how computer system 1300 may be embodied as a tablet 1300A, a laptop 1300B, or an HMD 1300C, but the ellipsis 1300D illustrates how computer system 1300 may be embodied in other forms as well.

In its most basic configuration, computer system 1300 includes various different components. FIG. 13 shows that computer system 1300 includes one or more processors 1305 (aka a "hardware processing unit"), a machine learning (ML) engine 1310, graphics rendering engine(s) 1325, a display system 1330, input/output (I/O) interfaces 1335, one or more sensors 1340, and storage 1345.

Regarding the processor(s) 1305, it will be appreciated that the functionality described herein can be performed, at least in part, by one or more hardware logic components (e.g., the processor(s) 1305). For example, and without limitation, illustrative types of hardware logic components/processors that can be used include Field-Programmable Gate Arrays ("FPGA"), Program-Specific or Application-Specific Integrated Circuits ("ASIC"), Application-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

The ML engine 1310 may be implemented as a specific processing unit (e.g., a dedicated processing unit as described earlier) configured to perform one or more specialized operations for the computer system 1300. As used herein, the terms "executable module," "executable component," "component," "module," or "engine" can refer to hardware processing units or to software objects, routines, or methods that may be executed on computer system 1300. The different components, modules, engines, and services described herein may be implemented as objects or processors that execute on computer system 1300 (e.g. as separate threads). The ML engine 1310 (or perhaps even just the processor(s) 1305) can be configured to perform any of the disclosed method acts or other functionalities.

As used herein, a ML engine 1310 can be utilized to generate a machine learning model (e.g., a predictive model or neural network). Reference to any type of machine learning within this disclosure may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning model to dynamically perform the disclosed operations (e.g., to predict 3DOF velocity based on input inertial tracking data and/or to perform other operations).

The graphics rendering engine 1325 is configured, with the hardware processing unit 1305, to render one or more virtual objects within the scene. As a result, the virtual objects accurately move in response to a movement of the user and/or in response to user input as the user interacts within the virtual scene. The computer system 1300 may include a display system 1330 (e.g., laser diodes, light emitting diodes (LEDs), microelectromechanical systems (MEMS), mirrors, lens systems, diffractive optical elements (DOES), display screens, and/or combinations thereof) for presenting virtual objects within the scene.

I/O interface(s) 1335 includes any type of input or output device. Such devices include, but are not limited to, touch screens, displays, a mouse, a keyboard, a controller, and so forth. Any type of input or output device should be included among I/O interface(s) 1335, without limitation.

During use, a user of the computer system 1300 is able to perceive information (e.g., a mixed-reality environment) through a display screen that is included among the I/O interface(s) 1335 and that is visible to the user. The I/O interface(s) 1335 and sensors 1340/1365 also include gesture detection devices, eye tracking systems, and/or other movement detecting components (e.g., head tracking cameras, depth detection systems, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The computer system 1300 may also be connected (via a wired or wireless connection) to external sensors 1365 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses.

Storage 1345 may be physical system memory, which may be volatile, non-volatile, or some combination of the two. The term "memory" may also be used herein to refer to non-volatile mass storage such as physical storage media. If computer system 1300 is distributed, the processing, memory, and/or storage capability may be distributed as well.

Storage 1345 is shown as including executable instructions (i.e. code 1350). The executable instructions (i.e. code 1350) represent instructions that are executable by the processor(s) 1305 of computer system 1300 to perform the disclosed operations, such as those described in the various methods. Storage 1345 is also shown as including data 1355. Data 1355 may include any type of data, including inertial tracking data, visual tracking data, radio-based positioning data, pose data, DNN data, volumetric data structure(s), meshes, and so forth, without limitation.

The disclosed embodiments may comprise or utilize a special-purpose or general-purpose computer including computer hardware, such as, for example, one or more processors (such as processor(s) 1305) and system memory (such as storage 1345), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1300 may also be connected (via a wired or wireless connection) to external sensors (e.g., one or more remote cameras) or devices via a network 1360. For example, computer system 1300 can communicate with any number devices or cloud services to obtain or process data. In some cases, network 1360 may itself be a cloud network. Furthermore, computer system 1300 may also be connected through one or more wired or wireless networks 1360 to remote/separate computer systems(s) 1370 that are configured to perform any of the processing described with regard to computer system 1300.

A "network," like network 1360, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1300 will include one or more communication channels that are used to communicate with the network 1360. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing device configured for implementing a method for estimating six degree of freedom (6DOF) positioning of the computing device while the computing device is in a pedestrian dead reckoning mode by using inertial tracking data and a predictive model trained on both observed exteroceptive sensor data and inertial tracking data, the computing device comprising:
   a set of one or more inertial tracking components configured to generate inertial tracking data, the set of one or more inertial tracking components including at least one of an accelerometer, a gyroscope and/or a compass;
   one or more processors; and
   one or more computer-readable hardware storage devices having stored computer-executable instructions that are operable, when executed by the one or more processors, to cause the computing device to implement the method for estimating 6DOF positioning of the computing device while the computing device is in the pedestrian dead reckoning mode, the method comprising:
   obtaining a set of inertial tracking data from the set of one or more inertial tracking components while the computing device is in the pedestrian dead reckoning mode;
   obtaining an estimated three degree of freedom (3DOF) velocity of the computing device as output from a predictive model in response to providing a first subset of inertial tracking data from the set of inertial tracking data as input into the predictive model, the predictive model having been trained on a set of training data including both observed exteroceptive sensor data and observed inertial tracking data; and
   obtaining an estimated 6DOF positioning of the computing device by fusing the estimated 3DOF velocity with a second subset of inertial tracking data that is based on the set of inertial tracking data.

2. The computing device of claim 1, wherein the first subset of inertial tracking data comprises acceleration data obtained by the accelerometer and angular velocity data obtained by the gyroscope.

3. The computing device of claim 2, wherein the first subset of inertial tracking data further comprises an estimated 3DOF rotation of the computing device.

4. The computing device of claim 1, wherein the second subset of inertial tracking data comprises an estimated 3DOF rotation of the computing device.

5. The computing device of claim 4, wherein the second subset of inertial tracking data further comprises acceleration data obtained by the accelerometer, angular velocity data obtained by the gyroscope, or heading data obtained by the compass.

6. The computing device of claim 1, wherein at least a portion of the set of training data is provided by a specific user and a specific computing device, and includes metadata indicating a hardware attribute of the specific computing device and a user activity or user class associated with the specific user.

7. The computing device of claim 1, wherein the exteroceptive sensor data comprises radio-based positioning data.

8. The computing device of claim 1, wherein the wherein the exteroceptive sensor data comprises visual tracking data.

9. The computing device of claim 1, wherein the method further comprises:
in response to a detected triggering condition, activating a radio-based positioning mode for the computing device; and
in response to the radio-based positioning mode becoming activated, tuning the predictive model by further training the predictive model on radio-based positioning data obtained by a radio-based positioning system of the computing device fused with inertial tracking data from the set of one or more inertial tracking components.

10. The computing device of claim 9, wherein the triggering condition includes detecting a presence of radio-based positioning data obtained by the radio-based positioning system that is available for use in tuning the predictive model.

11. The computing device of claim 9, wherein the triggering condition includes detecting that the radio-based positioning data obtained by the radio-based positioning system has a signal quality or confidence level that meets or exceeds a threshold value.

12. The computing device of claim 9, wherein the radio-based positioning data used as training input includes at least one of: position measurements, velocity measurements, pseudo-range measurements, Doppler measurements, or carrier phase measurements.

13. The computing device of claim 9, wherein tuning the predictive model generates a tuned predictive model, and the tuned predictive model is associated with a particular user that is operating the computing device, with a particular activity that the user is engaged in, or with the computing device.

14. The computing device of claim 9, wherein the method further comprises:
in response to determining that the triggering condition is no longer present, deactivating the radio-based positioning mode, refraining from tuning the predictive model, and activating the pedestrian dead reckoning mode.

15. The computing device of claim 1, wherein the method further comprises:
in response to a detected triggering condition, activating a radio-based positioning mode for the computing device;
in response to the radio-based positioning mode becoming activated, obtaining training data for training the predictive model, the training data including radio-based positioning data obtained by a radio-based positioning system and inertial tracking data from the set of one or more inertial tracking components;
transmitting the training data to a remote system configured to tune the predictive model by further training the predictive model on the transmitted training data; and
receiving, from the remote system, the tuned predictive model which is tuned by the remote system with the training data.

16. The computing device of claim 1, wherein the method further comprises:

in response to a detected triggering condition, activating a visual tracking mode for the computing device; and
in response to the visual tracking mode becoming activated, tuning the predictive model by further training the predictive model on visual tracking data obtained by a visual tracking system of the computing device fused with inertial tracking data from the set of one or more inertial tracking components.

17. The computing device of claim 16, wherein the triggering condition includes detecting a presence of visual tracking data obtained by the visual tracking system that is available for use in tuning the predictive model.

18. The computing device of claim 16, wherein the triggering condition includes detecting that the visual tracking data obtained by the visual tracking system has a quality or precision value that meets or exceeds a threshold value.

19. The computing device of claim 16, wherein tuning the predictive model generates a tuned predictive model, and the tuned predictive model is associated with a particular user that is operating the computing device, with a particular activity that the user is engaged in, or with the computing device.

20. The computing device of claim 16, wherein the method further comprises:
in response to that the triggering condition is no longer present, deactivating the visual tracking mode, refraining from tuning the predictive model, and activating the pedestrian dead reckoning mode.

21. The computing device of claim 1, wherein the method further comprises:
in response to a detected triggering condition, activating a visual tracking mode for the computing device;
in response to the visual tracking mode becoming activated, obtaining tuning data for tuning the predictive model, the tuning data including visual tracking data obtained by a visual tracking system of the computing device and inertial tracking data from the set of one or more inertial tracking components;
transmitting the tuning data to a remote system configured to tune the predictive model by further training the predictive model on the transmitted tuning data; and
receiving, from the remote system, the tuned predictive model.

22. The computing device of claim 1, wherein the computing device is a head-mounted display (HMD) and the method further comprises:
rendering a mixed-reality scene based on the estimated 6DOF positioning of the computing device.

23. A method for estimating six degree of freedom (6DOF) positioning of a computing device while the computing device is in a pedestrian dead reckoning mode by using inertial tracking data and a predictive model trained on both observed exteroceptive sensor data and inertial tracking data, the method comprising:
detecting, with a computing device, a pedestrian dead reckoning mode triggering condition;
in response to detecting the pedestrian dead reckoning mode triggering condition, obtaining a set of inertial tracking data from a set of one or more inertial tracking components of the computing device, the set of one or more inertial tracking components including at least one of an accelerometer, a gyroscope and/or a compass;
obtaining an estimated three degree of freedom (3DOF) velocity of the computing device as output from a predictive model in response to providing at least acceleration data from the accelerometer and angular velocity data obtained by the gyroscope as input into the predictive model, the predictive model having been trained on a set of training data including both observed exteroceptive sensor data and observed inertial tracking data; and obtaining an estimated 6DOF positioning of the computing device without obtaining exteroceptive sensor data with an exteroceptive sensor system of the computing device by fusing the estimated 3DOF velocity with an estimated 3DOF rotation of the computing device, the estimated 3DOF rotation of the computing device being based on the set of inertial tracking data;

detecting, with the computing device, an exteroceptive sensor mode triggering condition; and in response to detecting the exteroceptive sensor mode triggering condition, obtaining radio-based positioning data with a radio-based positioning system of the computing device.

24. The method of claim 23, wherein the exteroceptive sensor mode comprises a radio-based positioning mode, wherein the pedestrian dead reckoning mode triggering condition includes detecting that the exteroceptive data, which comprises radio-based positioning data obtained from a radio-based positioning system, has a signal quality or confidence level that is below a threshold value.

25. The method of claim 24, wherein the exteroceptive sensor mode triggering condition includes detecting that radio-based positioning data from the radio-based positioning system has a signal quality or confidence level that is above a threshold value.

26. The method of claim 23, wherein the exteroceptive sensor mode comprises a visual tracking mode, and wherein the pedestrian dead reckoning mode triggering condition includes determining that the exteroceptive sensor data, which comprises visual tracking data obtained from a visual tracking system, has a signal quality or confidence level that is below a threshold value.

27. The method of claim 23, wherein the exteroceptive sensor mode comprises a visual tracking mode, and wherein the visual tracking mode triggering condition includes detecting that the exteroceptive sensor data, which comprises visual tracking data obtained from the visual tracking system, has a signal quality or confidence level that is above a threshold value.

28. A head-mounted display (HMD) configured for implementing a method for providing training data to an on-device neural network for training a predictive model for use in estimating six degree of freedom (6DOF) positioning of the HMD while the HMD is in a pedestrian dead reckoning mode, the HMD comprising:

a set of one or more inertial tracking components configured to generate inertial tracking data, the set of one or more inertial tracking components including at least one of an accelerometer, a gyroscope and/or a compass;

an exteroceptive sensor system configured to generate exteroceptive sensor data;

one or more processors; and one or more computer-readable hardware storage devices having stored computer-executable instructions that are operable, when executed by the one or more processors, to cause the HMD to implement the method for providing training data to an on-device neural network for training a predictive model for use in estimating 6DOF positioning of the HMD while the HMD is in a pedestrian dead reckoning mode, the method comprising:

obtaining a set of inertial tracking data from the set of one or more inertial tracking components while the computing device is not in the pedestrian dead reckoning mode;

obtaining the exteroceptive sensor data from the exteroceptive sensor system; and training a predictive model for use in estimating 6DOF positioning of the HMD when the HMD is in a pedestrian dead reckoning mode by providing training data to an on-device neural network, the training data comprising (1) the set of inertial tracking data as input and (2) at least a portion of the inertial tracking data fused with the exteroceptive data as ground truth output.

29. The HMD of claim 28, wherein the exteroceptive sensor system comprises a visual tracking system configured to generate visual tracking data that comprises the exteroceptive sensor data.

30. The HMD of claim 28, wherein the exteroceptive sensor system comprises a radio-based positioning system configured to generate radio-based positioning data that comprises the exteroceptive sensor data.

31. The HMD of claim 28, wherein the method further comprises providing the training data to a remote system that uses the training data to train a separate predictive model for use in estimating 6DOF positioning of a different HMD that is in a pedestrian dead reckoning mode by providing the training data to the separate neural network.

* * * * *